(12) United States Patent
Cao

(10) Patent No.: US 11,353,653 B2
(45) Date of Patent: Jun. 7, 2022

(54) OPTICAL WAVEGUIDE APPARATUS

(71) Applicant: Huawei Technologies Co., Ltd., Shenzhen (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/135,018

(22) Filed: Dec. 28, 2020

(65) Prior Publication Data

US 2021/0149269 A1    May 20, 2021

Related U.S. Application Data

(63) Continuation of application No. PCT/CN2019/093961, filed on Jun. 29, 2019.

(30) Foreign Application Priority Data

Jun. 29, 2018 (CN) .......................... 201810717423.3

(51) Int. Cl.
| | |
|---|---|
| *G02B 6/12* | (2006.01) |
| *G02B 6/293* | (2006.01) |
| *G02F 1/13* | (2006.01) |
| *G02F 1/225* | (2006.01) |

(52) U.S. Cl.
CPC ..... *G02B 6/12033* (2013.01); *G02B 6/12009* (2013.01); *G02B 6/12016* (2013.01); *G02B 6/29325* (2013.01); *G02F 1/1326* (2013.01); *G02B 6/29392* (2013.01); *G02F 1/2252* (2013.01)

(58) Field of Classification Search
None
See application file for complete search history.

(56) References Cited

U.S. PATENT DOCUMENTS 3,963,310 A * 6/1976 Giallorenzi ............ G02B 6/126
349/196
4,893,907 A * 1/1990 Mallinson ............... G02F 1/132
349/171
(Continued)

FOREIGN PATENT DOCUMENTS

| CN | 1318764 A | 10/2001 |
| CN | 1441305 A | 9/2003 |

(Continued)

*Primary Examiner* — Michael Stahl
(74) *Attorney, Agent, or Firm* — Slater Matsil, LLP

(57) ABSTRACT

An optical waveguide apparatus including a first dispersion unit and a separation unit. The first dispersion unit is connected to the separation unit, the first dispersion unit is configured to disperse a frequency component of at least one first optical signal, and the separation unit is configured to separate, into at least one second optical signal based on configuration information, the frequency component that is of the at least one first optical signal and that is dispersed by the first dispersion unit. The separation unit is implemented by a variable optical waveguide, and the variable optical waveguide is an optical waveguide that implements at least one of the following functions based on the configuration information: forming an optical waveguide, eliminating an optical waveguide, and changing a shape of an optical waveguide.

18 Claims, 7 Drawing Sheets

(56) References Cited

U.S. PATENT DOCUMENTS

| | | | |
|---|---|---|---|
| 5,193,130 A | | 3/1993 | Nishiwaki et al. |
| 6,154,591 A | | 11/2000 | Kershaw |
| 6,278,813 B1 | * | 8/2001 | Takada ............... G02B 6/12011 385/24 |
| 6,798,948 B2 | | 9/2004 | Delisle et al. |
| 6,888,661 B1 | | 5/2005 | Islam et al. |
| 7,046,872 B2 | | 5/2006 | Sakuma et al. |
| 7,050,659 B1 | * | 5/2006 | Williams ............... G02F 1/3511 385/14 |
| 7,151,868 B1 | | 12/2006 | Wang |
| 7,450,309 B1 | * | 11/2008 | Ma ..................... G02B 6/12007 359/618 |
| 7,706,643 B1 | | 4/2010 | Meli et al. |
| 2002/0159688 A1 | | 10/2002 | Kim et al. |
| 2003/0202732 A1 | | 10/2003 | Glebov et al. |
| 2003/0228091 A1 | | 12/2003 | Lee et al. |
| 2005/0111775 A1 | * | 5/2005 | Fridman ................. G02F 1/035 385/14 |
| 2006/0126992 A1 | * | 6/2006 | Hashimoto ........ G02B 6/12009 385/14 |
| 2009/0116835 A1 | | 5/2009 | Kwon et al. |

FOREIGN PATENT DOCUMENTS

| | | |
|---|---|---|
| CN | 103091783 A | 5/2013 |
| CN | 104155723 A | 11/2014 |
| CN | 104730644 A | 6/2015 |
| CN | 107688250 A | 2/2018 |
| CN | 107768786 A | 3/2018 |
| JP | H0886924 A | 4/1996 |

* cited by examiner

OPTICAL WAVEGUIDE APPARATUS

CROSS-REFERENCE TO RELATED APPLICATIONS

This application is a continuation of International Application No. PCT/CN2019/093961, filed on Jun. 29, 2019, which claims priority to Chinese Patent Application No. 201810717423.3, filed on Jun. 29, 2018. The disclosures of the aforementioned applications are hereby incorporated by reference in their entireties.

TECHNICAL FIELD

This application relates to the field of optical communications, and more specifically, to an optical waveguide apparatus.

BACKGROUND

An arrayed waveguide grating (AWG) is an important constituent part in a wavelength division network, and is mainly used in an optical terminal multiplexer (OTM) site to multiplex or demultiplex an optical signal. A channel spacing of an existing AWG is fixed. Usually, one AWG can support only one channel spacing. There are a plurality of requirements for the channel spacing in a current wavelength division network. Therefore, the existing AWG cannot meet a use requirement, and how to effectively enable a same AWG to meet different channel spacings becomes a problem that needs to be resolved urgently.

SUMMARY

This application provides an optical waveguide apparatus. The optical waveguide apparatus can transmit optical signals with different channel spacings or perform hybrid transmission of optical signals with different channel spacings, thereby reducing costs, meeting market and user requirements, and improving performance of the optical waveguide apparatus.

According to a first aspect, an optical waveguide apparatus is provided and includes a first dispersion unit and a separation unit. The first dispersion unit is connected to the separation unit, the first dispersion unit is configured to disperse a frequency component of at least one first optical signal, and the separation unit is configured to separate, into at least one second optical signal based on configuration information, the frequency component of the at least one first optical signal dispersed by the first dispersion unit, where the separation unit is implemented by a variable optical waveguide, and the variable optical waveguide is an optical waveguide that implements at least one of the following functions based on the configuration information: forming an optical signal transmission channel, eliminating the optical signal transmission channel, and changing a shape of the optical signal transmission channel.

In the optical waveguide apparatus provided in the first aspect, because the separation unit is implemented by the variable optical waveguide, based on the configuration information and based on a preset requirement or need, the separation unit may flexibly split, into a frequency component of at least one second optical signal that needs to be output, the frequency component of the at least one first optical signal dispersed by the first dispersion unit. The optical waveguide apparatus may support different channel spacings (effective frequency components widths), so that a case in which one optical waveguide apparatus needs to be disposed for each channel spacing is avoided, thereby improving use efficiency and performance of the optical waveguide apparatus. Therefore, types of the optical waveguide apparatus can be reduced, goods preparation costs can be reduced, and maintenance and management costs of the optical waveguide apparatus can be reduced.

In a possible implementation of the first aspect, the separation unit is further configured to change composition of the frequency component of the at least one second optical signal based on the configuration information. In this implementation, the optical waveguide apparatus can be enabled to support output of second optical signals with different frequency component composition. Further, use efficiency and performance of the optical waveguide apparatus are improved, a use range of the optical waveguide apparatus is increased, and costs are further reduced.

In a possible implementation of the first aspect, the composition of the frequency component includes at least one of a channel spacing of the optical signal, a center frequency of the optical signal, and a frequency grid of the optical signal.

In a possible implementation of the first aspect, the apparatus further includes a control unit, the control unit is connected to the separation unit, and the control unit is configured to control, based on the configuration information, the separation unit to separate the frequency component of the at least one first optical signal into the at least one second optical signal.

In a possible implementation of the first aspect, the separation unit includes a liquid crystal material, the control unit includes at least one electrode, and the at least one electrode determines, based on the configuration information, whether to apply a voltage to the at least one electrode, so that at least one of following functions is implemented in the liquid crystal material: forming an optical waveguide, eliminating an existing optical waveguide, and changing a shape of the existing optical waveguide, and the liquid crystal material is controlled to separate the frequency component of the at least one first optical signal into the at least one second optical signal. In this implementation, the control unit and the separation unit are separately implemented by using the electrode and the liquid crystal material, so that costs are relatively low and implementation is facilitated.

In a possible implementation of the first aspect, a frequency width allowed to be blocked between adjacent second optical signals in the at least one second optical signal is greater than or equal to a frequency width corresponding to any one of the at least one electrode.

In a possible implementation of the first aspect, the apparatus further includes an input unit and an output unit, the input unit is connected to the first dispersion unit, the input unit is configured to transmit the at least one first optical signal to the first dispersion unit, the output unit is connected to the separation unit, and the output unit is configured to output the at least one second optical signal.

In a possible implementation of the first aspect, the first dispersion unit includes an arrayed waveguide or a concave grating.

In a possible implementation of the first aspect, at least one of the at least one first optical signal includes a plurality of optical channels.

In a possible implementation of the first aspect, the apparatus further includes a second dispersion unit, the second dispersion unit is connected to the separation unit, the separation unit is further configured to transmit at least some second optical signals in the at least one second optical signal to the second dispersion unit based on the configuration information, and the second dispersion unit is configured to combine the some second optical signals into at least one third optical signal. In this implementation, hybrid transmission and exchanging of second optical signals with different frequency components are implemented, in other words, hybrid transmission and exchanging of optical signals with different channel spacings are implemented. Therefore, performance and efficiency of the optical waveguide apparatus are improved.

In a possible implementation of the first aspect, the apparatus includes an output unit, the output unit is connected to the second dispersion unit, and the output unit is configured to output the at least one third optical signal.

In a possible implementation of the first aspect, the configuration information includes composition of a frequency component of each of the at least one second optical signal.

According to a second aspect, an optical waveguide apparatus is provided and includes a combiner unit and a third dispersion unit. The combiner unit is connected to the third dispersion unit, the combiner unit is configured to transmit, based on configuration information, at least one fourth optical signal to a position corresponding to composition of a frequency component of the at least one fourth optical signal, and the third dispersion unit is configured to combine the at least one fourth optical signal into at least one fifth optical signal from the position corresponding to the composition of the frequency component of the at least one fourth optical signal, where the combiner unit is implemented by a variable optical waveguide, and the variable optical waveguide is an optical waveguide that implements at least one of the following functions based on the configuration information: forming an optical signal transmission channel, eliminating the optical signal transmission channel, and changing a shape of the optical signal transmission channel.

In the optical waveguide apparatus provided in the second aspect, because the combiner unit is implemented by the variable optical waveguide, a function such as forming the optical signal transmission channel, eliminating the optical signal transmission channel, or changing the shape of the optical signal transmission channel can be implemented. The combiner unit may flexibly form, based on the configuration information, a transmission channel for transmitting the at least one fourth optical signal, and transmit the at least one fourth optical signal to the position corresponding to the composition of the frequency component of the at least one fourth optical signal. The third dispersion unit may combine the at least one fourth optical signal into the at least one fifth optical signal from the position corresponding to the composition of the frequency component of the at least one fourth optical signal. The optical waveguide apparatus may support different channel spacings, in other words, the optical waveguide apparatus may form, based on composition of frequency components of different fourth optical signals, a transmission channel that can be used to transmit the different fourth optical signals, thereby avoiding a case in which one optical waveguide apparatus needs to be disposed for each channel spacing, and improving use efficiency and performance of the optical waveguide apparatus. Therefore, types of the optical waveguide apparatus can be reduced, goods preparation costs can be reduced, and maintenance and management costs of the optical waveguide apparatus can be reduced.

In a possible implementation of the second aspect, the combiner unit is further configured to change the composition of the frequency component of the at least one fourth optical signal based on the configuration information. In this implementation, the optical waveguide apparatus can be enabled to support transmission of fourth optical signals with different frequency components. Further, use efficiency and performance of the optical waveguide apparatus are improved, and a use range of the optical waveguide apparatus is increased.

In a possible implementation of the second aspect, the composition of the frequency component includes at least one of a channel spacing of the optical signal, a center frequency of the optical signal, and a frequency grid of the optical signal.

In a possible implementation of the second aspect, the apparatus further includes a control unit, the control unit is connected to the combiner unit, and the control unit is configured to control, based on the configuration information, the combiner unit to transmit the at least one fourth optical signal to the position corresponding to the composition of the frequency component of the at least one fourth optical signal.

In a possible implementation of the second aspect, the combiner unit includes a liquid crystal material, the control unit includes at least one electrode, and the at least one electrode determines, based on the configuration information, whether to apply a voltage to the at least one electrode, so that a transmission channel of the at least one fourth optical signal is formed in the liquid crystal material, and the liquid crystal material is controlled to transmit the at least one fourth optical signal to the position corresponding to the composition of the frequency component of the at least one fourth optical signal.

In a possible implementation of the second aspect, a frequency width allowed to be blocked between two adjacent fourth optical signals in the at least one fourth optical signal is greater than or equal to a frequency width corresponding to any one of the at least one electrode.

In a possible implementation of the second aspect, the apparatus further includes an input unit and an output unit, the input unit is connected to the combiner unit, the input unit is configured to transmit the at least one fourth optical signal to the combiner unit, the output unit is connected to the third dispersion unit, and the output unit is configured to output the at least one fifth optical signal.

In a possible implementation of the second aspect, the third dispersion unit includes an arrayed waveguide or a concave grating.

In a possible implementation of the second aspect, at least one of the at least one fifth optical signal includes a plurality of optical channels.

In a possible implementation of the second aspect, the configuration information includes composition of a frequency component of each of the at least one fourth optical signal.

DETAILED DESCRIPTION OF ILLUSTRATIVE EMBODIMENTS

Figure 1:
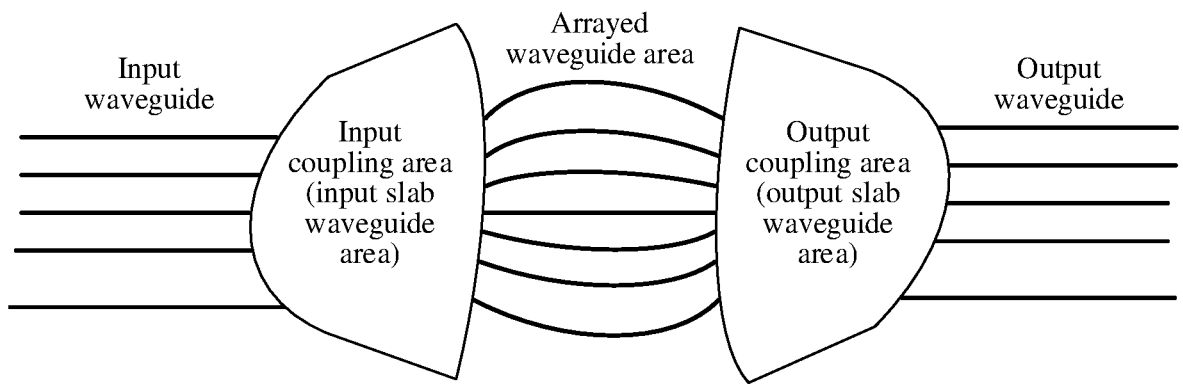
FIG. 1 is a schematic structural diagram of an existing AWG.

The following describes technical solutions of this application with reference to the accompanying drawings.

Related terms in this application are briefly described first.

An optical waveguide is a dielectric structure that guides an optical signal or an optical wave to propagate in the optical waveguide, or a light guiding channel that limits an optical signal (or an optical wave) to be transmitted inside a specific medium or near a surface of the specific medium. The medium may be an optical material or the like mentioned below, for example, may include silicon, silicon oxide, and liquid crystal.

A variable optical waveguide controls an optical material based on configuration information, to form an optical signal transmission channel, eliminate an optical signal transmission channel, or change a shape of an optical signal transmission channel, thereby implementing a part or a dielectric structure of a corresponding optical processing function. In other words, the variable optical waveguide is an optical waveguide that controls an optical material based on configuration information to form an optical waveguide, eliminate an existing optical waveguide, or change a shape of an existing optical waveguide. Forming an optical waveguide may be understood as forming a new optical waveguide. The variable optical waveguide may adjust an optical waveguide unit based on the configuration information, to implement an optical processing function or performance corresponding to the optical processing function. For example, the variable optical waveguide controls the optical material based on the configuration information to form a transmission channel that can be used to transmit the optical signal, eliminate an existing transmission channel that is used to transmit the optical signal, or change a shape, a direction, and transmission performance of an existing transmission channel that is used to transmit the optical signal. There are a plurality of manners for controlling the optical material based on the configuration information. For example, the optical material is liquid crystal, and uses a dot-matrix electrode. The configuration information includes a voltage application manner of a corresponding dot-matrix electrode and/or an electrode whose voltage needs to be changed, and the like. A corresponding voltage is applied to the corresponding dot-matrix electrode in a preset area of the optical material (or a corresponding voltage is not applied, and whether to apply a voltage depends on a type of a liquid crystal material), so that a refractive index of the preset area is greater than a refractive index of another area of the optical material, and the optical signal transmission channel may be formed in the preset area.

A fixed optical waveguide corresponds to the variable optical waveguide, and is an optical waveguide in which a preset optical signal transmission channel cannot be changed. In other words, after the fixed optical waveguide is produced, all preset optical signal transmission channels are also produced, and usually cannot be changed subsequently. The preset optical signal transmission path is a preset channel that has a precondition of becoming an optical signal transmission channel (or that can be an optical signal transmission channel). Once an optical signal is input to the channel, the channel becomes an optical signal transmission channel. If no optical signal is input to the channel, the channel cannot be referred to as an optical signal transmission channel in an accurate sense. Generally, an optical processing function implemented by the fixed optical waveguide cannot be changed. Generally, after the fixed optical waveguide is produced, performance corresponding to the optical processing function implemented by the fixed optical waveguide cannot be changed.

An optical channel is an optical signal (also referred to as a single-wavelength optical signal, a single wavelength, or the like) that is carried on a single wavelength in an optical fiber transmission system. In other words, the optical channel is an information structure that includes an information payload with a specific bandwidth (for specific content, refer to ITU-TG.870).

A channel spacing of the optical signal is a frequency difference between adjacent optical channels (refer to ITU-T G.692), or a difference between center frequencies of adjacent optical channels or a difference between center wavelengths of adjacent optical channels (for specific content, refer to ITU-T G.671).

A frequency grid is a set of reference frequencies be used to indicate an allowed nominal center frequency that can be used to define an application (for specific content, refer to ITU-T G.694.1).

An AWG is an important constituent part in a wavelength division network and is mainly used in an OTM site to multiplex or demultiplex an optical signal or an optical channel.

The AWG mainly includes an input waveguide, an input coupling area, an arrayed waveguide area, an output coupling area, and an output waveguide area. FIG. 1 is a schematic structural diagram of an AWG. An input coupling area (or referred to as an input slab waveguide area) and an output coupling area (or referred to as an output slab waveguide area) use a structure similar to a concave grating and a Rowland circle. The input waveguide and an output waveguide respectively limit and conduct the optical signal. Ports of the input waveguide and the output waveguide are located on a circumference of the Rowland circle, an arrayed waveguide is located on a circumference of the concave grating, and a relatively large optical channel difference is introduced at the arrayed waveguide, so that the grating works in high-order diffraction.

An optical signal demultiplexing process is used as an example to briefly describe a working principle of the AWG. An optical signal is input to an input optical fiber, and is sent to the input coupling area through the input waveguide. Both the input coupling area and the output coupling area are of a Rowland circle structure, and the input coupling area and the output coupling area form a mirror relationship. A feature of the Rowland circle is that after being reflected, an optical signal transmitted from any point on the Rowland circle still focuses on the Rowland circle. A relatively large optical channel difference is introduced at the arrayed waveguide, so that the grating works in high-order diffraction. An optical channel difference formed by the input coupling area, the arrayed waveguide, and the output coupling area needs to meet a grating equation, to focus on a Rowland circle of the output coupling area, and at the same time, approximately uniformly distribute frequency components of the input optical signal on the Rowland circle of the output coupling area. The output waveguide outputs each frequency component of the input optical signal, in other words, each output waveguide outputs some frequency components of the input optical signal (each output optical signal includes some frequency components of the input optical signal). The output waveguide transmits an output optical signal to an output optical fiber. Generally, in the optical signal demultiplexing process, the input optical signal of the AWG includes a plurality of optical channels, and one output optical signal includes only one optical channel. An optical signal multiplexing process is an inverse process of the optical signal demultiplexing process, and the input optical signal includes some frequency components of the output optical signal. Based on a principle that an optical channel is reversible, because the input coupling area and the output coupling area are symmetrical in the AWG, the optical signal multiplexing process may be that an input portion and an output portion in the optical signal demultiplexing process are exchanged. For example, when the AWG shown in FIG. 1 is used for optical signal multiplexing, the input optical signal is input from the output waveguide, and the output optical signal is output from the input waveguide. When the AWG is used for optical signal demultiplexing, there is usually only one input optical signal, and the input optical signal may include a plurality of optical channels; and there are usually a plurality of output optical signals, and each output optical signal includes only one optical channel. When the AWG is used for optical signal multiplexing, there are usually a plurality of input optical signals, and each input optical signal includes one optical channel; and there is usually only one output optical signal, and the output optical signal may include a plurality of optical channels. In addition, there is another cyclic AWG. The cyclic AWG may have a plurality of input optical signals, and each input optical signal may include a plurality of optical channels; and output of the cyclic AWG may also have a plurality of optical channels, and each output optical signal may include a plurality of optical channels. The cyclic AWG may send an optical channel in each input optical signal to different output optical signals, and this is equivalent to superimposition of a plurality of AWGs. A principle of the cyclic AWG is similar to that of the foregoing AWG, and details are not described herein again.

Some structural parameters of the AWG need to meet the grating equation to implement an optical signal multiplexing or demultiplexing function. The grating equation of the AWG is shown in formula (1).

$$n_{si}*d_i*\sin\theta_i + n_c*\Delta L + n_{so}*d_o*\sin\theta = m\lambda \quad (1)$$

In formula (1), $n_{si}$ is a reflective index of the input coupling area, $n_{so}$ is a reflective index of the output coupling area, $n_c$ is a reflective index of the arrayed waveguide, $d_i$ is a period of the arrayed waveguide at an input coupling area side, $d_o$ is a period of the arrayed waveguide at an output coupling area side, $\theta_i$ is a diffraction angle in the input coupling area, $\theta_o$ is a diffraction angle in the output coupling area, m is a diffraction order at which the AWG works, $\lambda$ is an optical signal wavelength, and $\Delta L$ is a length difference of adjacent arrayed waveguides.

An angular dispersion equation of the AWG may be derived based on the grating equation of the AWG, as shown in formula (2).

$$d\theta_o/d\lambda = n_g*m/n_{so}*d_o*n_c \quad (2)$$

In formula (2), $n_g$ is a group refractive index (an average refractive index of wave-combined lights), where $$n_g = n_c - \lambda_b*(dn_c/d\lambda) \quad (3)$$

$$\lambda_b = n_c*(\Delta L/m) \quad (4).$$

Formula (5) can be obtained.

$$\Delta\theta_o = n_g*m*\Delta\lambda/n_{so}*d_o*n_c \quad (5)$$

Because $\lambda_b*(dn_c/d\lambda)$ is a relatively small value, $n_g \approx n_c$, and formula (2) may be deformed into formula (6).

$$d\theta_o/d\lambda = m/n_{so}*d_o \quad (6)$$

It can be learned from formula (6) that dispersion angles of the AWG in the input coupling area and the output coupling area are basically uniform. In other words, regardless of a position of the output waveguide, a position of each frequency component is fixed on a Rowland circle of a coupling area, and the frequency components are basically uniformly distributed on the Rowland circle.

An etched diffraction grating (EDG) can also implement a same optical signal multiplexing or demultiplexing function as the AWG. The EDG mainly includes a coupling area and a concave grating, and a principle of the EDG is similar to that of the AWG. For brevity, details are not described herein again.

Figure 2:
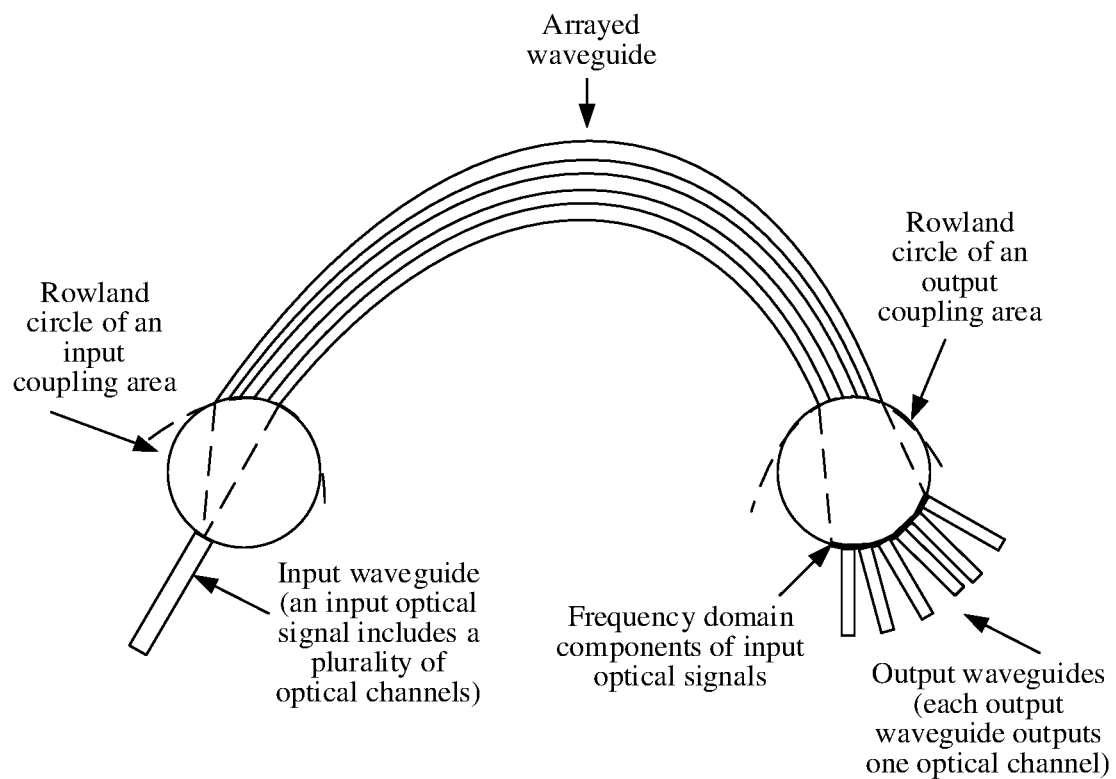
FIG. 2 is a schematic principle diagram of optical signal demultiplexing performed by an AWG.

FIG. 2 is a schematic principle diagram of optical signal demultiplexing performed by an AWG. As shown in FIG. 2, an input optical signal is sequentially transmitted to an input coupling area, an arrayed waveguide area, and an output coupling area through an input waveguide. Because both the input coupling area and the output coupling area are of a Rowland circle structure, a relatively large optical channel difference is introduced at an arrayed waveguide. When the input optical signal reaches a Rowland circle of the output coupling area, a frequency component of each optical channel included in the input optical signal may be dispersed on the Rowland circle of the output coupling area. The output waveguide outputs the frequency component of the optical channel. It can be learned from the foregoing analysis that, on the Rowland circle of the output coupling area, a position of each frequency point (frequency) is fixed, and is uniformly distributed on the Rowland circle of the output coupling area. For example, in FIG. 2, an arc segment marked black on the Rowland circle of the output coupling area is a position of each frequency component included in the input optical signal. All possible frequency components of an optical signal that can be processed by the AWG are dispersed on this arc. The output waveguide is connected to the Rowland circle of the output coupling area, and for an AWG, a position of each frequency point (frequency) is fixed on the Rowland circle of the output coupling area regardless of a frequency component of an output optical signal or a position of the output waveguide. In addition, for an AWG, an output waveguide is implemented by using a fixed optical waveguide, and a position of each output waveguide is fixed, in other words, a frequency component of an optical signal that can be output by each output waveguide is fixed.

Figure 3:
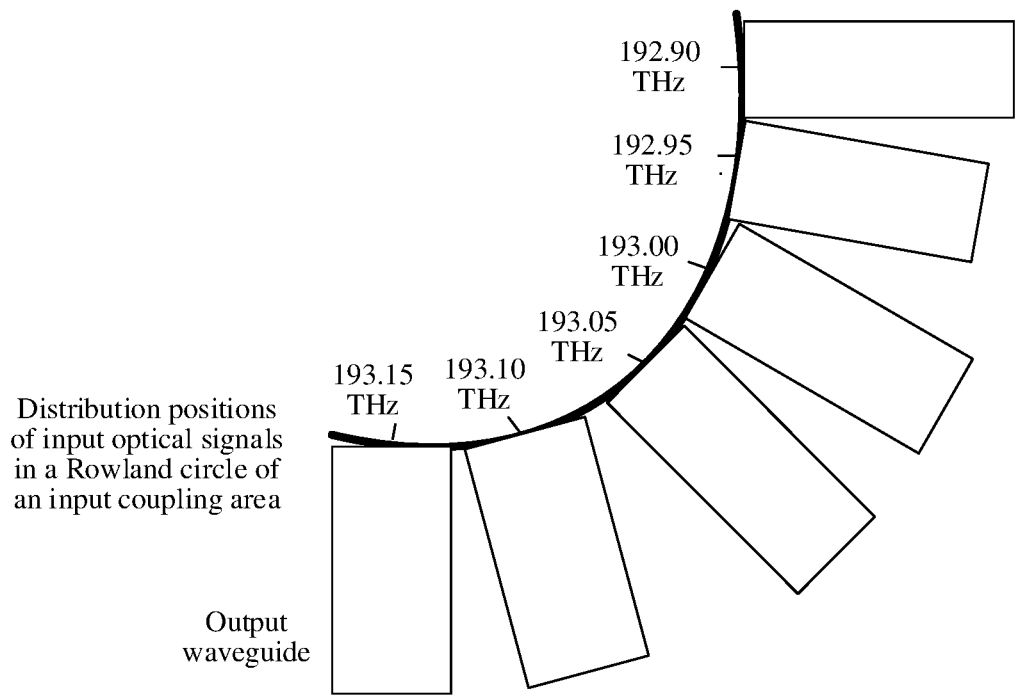
FIG. 3 is a schematic diagram in which frequency components of an input optical signal are dispersed on an arc of a Rowland circle of an output coupling area.

FIG. 3 is a schematic diagram in which frequency components of an input optical signal are dispersed on an arc of a Rowland circle of an output coupling area. As shown in FIG. 3, it is assumed that an input optical signal includes six optical channels, the input optical signal passes through an input coupling area, an arrayed waveguide area, and an output coupling area in sequence, and frequency domain components of the six optical channels are dispersed on an arc of a Rowland circle of the output coupling area. A frequency corresponding to a position of each point is fixed on the are of the Rowland circle of the output coupling area. The frequency domain components of the six optical channels are different, and therefore may be distributed at different positions of the arc. Corresponding to six output waveguides, each output waveguide is configured to output one optical channel. In the example shown in FIG. 3, it may be learned that a frequency width (or referred to as a frequency domain width) occupied by each output waveguide is 0.050 THz (0.050 THz may also be written as 50 GHz), and each output waveguide may be considered as an output channel. In the example shown in FIG. 3, all channel spacings are 50 GHz. For an AWG, the position of each frequency point (or frequency component) is fixed on the Rowland circle of the output coupling area regardless of a change of the channel spacing. The output waveguide is implemented by using a fixed optical waveguide, and a position of each output waveguide is fixed. This means that frequency domain start and end positions of an optical channel that can be output by each output waveguide and a frequency domain width that can be used for transmission are fixed. In other words, only a preset optical channel corresponding to the output waveguide can be output. For example, it is assumed that a center frequency of one optical channel in the input optical signal is 193.125 THz. For this optical channel, if a channel spacing is 50 GHz, a frequency domain range corresponding to an output waveguide (in other words, a range of an effective frequency component of an optical channel that can be output by the output waveguide or a maximum range of an effective frequency component of an optical channel that can be output by the output waveguide) needs to be within 193.10 THz to 193.15 THz. However, a position of the output waveguide in the AWG is fixed. Therefore, the AWG cannot output this optical channel (or performance of the optical channel is severely damaged after the optical channel is output).

In the prior art, for one (or one type of) AWG, a position of an output waveguide of the AWG is fixed, in other words, a channel spacing is fixed; and only an optical channel corresponding to the position of the output waveguide can be output, in other words, only an optical signal with a fixed channel spacing can be output. However, there are a plurality of channel spacings in a current wavelength division network. For example, a channel spacing of 100 Gbps is usually 50 GHz, a channel spacing of 200 Gbps may reach 62.5 GHz, a channel spacing of 400 Gbps may reach 75 GHz, and a channel spacing of 1 Tbps may reach 100 GHz.

Therefore, to meet a requirement of using the AWG in the prior art, one AWG needs to be created for each channel spacing, such as an AWG of a 50 GHz channel spacing, an AWG of a 62.5 GHz channel spacing, an AWG of a 75 GHz channel spacing, and an AWG of a 100 GHz channel spacing. In this way, relatively high costs are caused. In addition, there are many types of AWGs, thereby increasing maintenance and management costs, and increasing goods preparation costs. Various AWGs reduce a quantity of each type of AWGs (costs of an optical module are closely related to a delivery quantity). Therefore, manufacturing costs of the AWG are increased, affecting market promotion and application.

In addition, in the wavelength division network, it is also required to support hybrid transmission of optical signals with different channel spacings, and a same AWG needs to support hybrid transmission of optical signals with different channel spacings, in other words, support a flexible grid feature. The AWG in the prior art cannot support hybrid transmission of optical signals with different channel spacings. To support the FlexGrid at an OTM site, only a flexible wavelength selective switch (Flexible WSS) can be used, but the flexible WSS is very expensive. One AWG costs approximately hundreds of dollars, but one flexible WSS costs approximately thousands of dollars. This severely affects user's use requirements.

Based on the foregoing problems, this application provides an optical waveguide apparatus. The optical waveguide apparatus can transmit optical signals with different channel spacings or perform hybrid transmission of optical signals with different channel spacings, thereby reducing costs, meeting market and user requirements, and improving performance of the optical waveguide apparatus.

Figure 4:
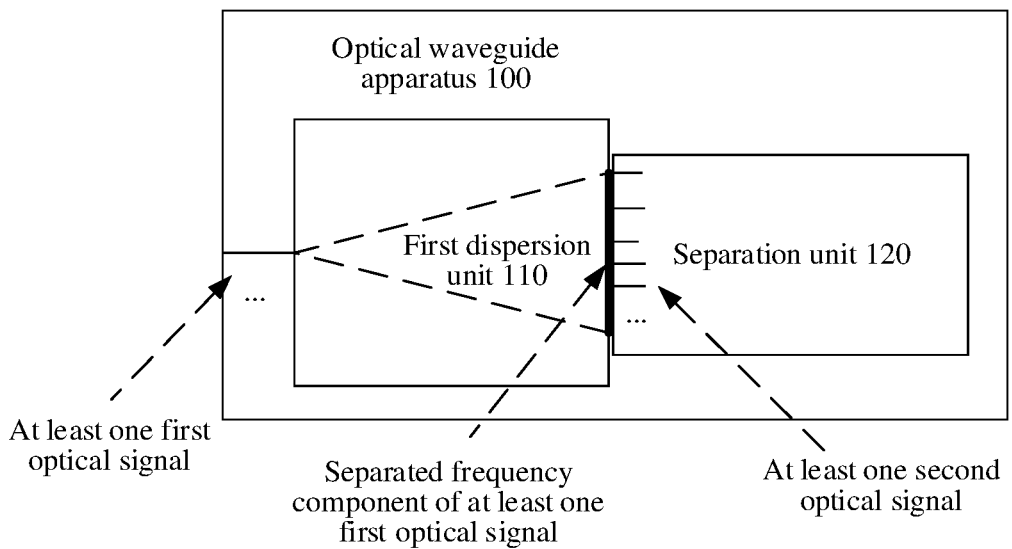
FIG. 4 is a schematic structural block diagram of an optical waveguide apparatus according to an embodiment of this application.

The optical waveguide apparatus provided in this application is described below with reference to FIG. 4. FIG. 4 is a schematic structural block diagram of the optical waveguide apparatus provided in this application. As shown in FIG. 4, the optical waveguide apparatus 100 includes a first dispersion unit 110 and a separation unit 120.

The first dispersion unit 110 is connected to the separation unit 120. The first dispersion unit 110 is configured to disperse a frequency component of at least one first optical signal. The separation unit 120 is configured to separate, into at least one second optical signal based on configuration information, the frequency component that is of the at least one first optical signal and that is separated by the first dispersion unit 110. The separation unit 120 is implemented by a variable optical waveguide, and the variable optical waveguide is an optical waveguide that forms an optical signal transmission channel based on the configuration information, or eliminates the optical signal transmission channel, or changes a shape of the optical signal transmission channel. Alternatively, the variable optical waveguide is an optical waveguide that can implement at least one of the following functions based on the configuration information: forming an optical waveguide, eliminating an existing optical waveguide, and changing a shape of the existing optical waveguide.

Specifically, the first dispersion unit 110 may disperse a frequency of the at least one first optical signal that is input to the first dispersion unit 110. In other words, the first dispersion unit 110 may implement a dispersion function. The dispersion function is to disperse an optical signal based on frequency components.

Because the separation unit 120 is implemented by a variable optical waveguide, the separation unit 120 may implement any one or more of the following functions: forming an optical waveguide, eliminating an optical waveguide, and changing a shape of an optical waveguide. Forming an optical waveguide may be understood as a newly formed optical waveguide, in other words, forming a new optical signal transmission channel. Alternatively, the variable optical waveguide may also be defined as an optical waveguide that implements at least one of the following functions based on the configuration information: forming an optical signal transmission channel, eliminating the optical signal transmission channel, and changing a shape of the optical signal transmission channel. The separation unit 120 may separate, into the at least one second optical signal based on the configuration information, the frequency component of the at least one first optical signal dispersed by the first dispersion unit 110. In other words, the separation unit 120 mainly completes two functions. A function is to separate, based on the configuration information, the frequency component of the at least one first optical signal dispersed by the first dispersion unit 110. This function is a main function. A second function is to combine the separated frequency components into the at least one second optical signal based on the configuration information. Briefly, the separation unit 120 may form, based on the configuration information, a transmission channel for outputting each of the at least one second optical signal, and finally output the at least one second optical signal. A center frequency of each of the at least one second optical signal may be different. In particular, a channel spacing of each of the at least one second optical signal may be different. In frequency domain, effective frequency components of different second optical signals in the at least one second optical signal do not overlap.

The configuration information may be pre-stored in the optical waveguide apparatus, or may not be stored in the optical waveguide apparatus, and is obtained from the outside and used when the separation unit 120 needs to separate the frequency component of the at least one first optical signal. The configuration information may include composition of a frequency component of each of the at least one second optical signal. In other words, the configuration information may be any one or more of the following: a preset effective frequency component width (or referred to as a frequency domain width for short) of each second optical signal in at least one second optical signal that needs to be output, start and end positions of an effective frequency component, a channel spacing, and a center frequency (or a nominal center frequency), or a frequency grid that needs to be met by the at least one second optical signal. The separation unit 120 separates the frequency component of the at least one first optical signal into at least one preset second optical signal based on the configuration information. The composition of the frequency component of each second optical signal may be different. The composition of the frequency component may include any one or more pieces of the following information: a center frequency of the second optical signal, a channel spacing of the second optical signal, a frequency grid applicable to the second optical signal, start and end positions of an effective frequency component of the second optical signal, an effective frequency component width of the second optical signal, and the like. In other words, the separation unit 120 may flexibly form, based on the configuration information, a transmission channel for outputting the at least one second optical signal, and an effective frequency component width of each transmission channel and start and end positions of an effective frequency component may be flexibly set based on the configuration information. For different first optical signals, frequency components of at least one second optical signal that are obtained by the separation unit 120 by separating frequency components of the first optical signals based on the configuration information may be different. For example, for a $1^{st}$ first optical signal, the separation unit 120 separates, based on the configuration information, frequency components of the $1^{st}$ first optical signal into two second optical signals whose center frequencies are respectively 193.13125 THz and 193.01875 THz and whose channel spacings are respectively 75 GHz and 150 GHz, or whose effective frequency component widths are respectively 75 GHz and 150 GHz. In other words, maximum ranges of an effective frequency component of an optical signal channel formed by the separation unit 120 are respectively 193.09375 THz to 193.15625 THz and 192.94375 THz to 193.09375 THz. Such division of the frequency component range also constitutes a frequency grid. When the waveguide apparatus is used for optical signal demultiplexing, there is usually only one first optical signal. However, as described above, when the waveguide apparatus is used as a cyclic AWG, there may be a plurality of first optical signals. Composition of a frequency component of another first optical signal may be the same as or different from that of the $1^{st}$ optical signal. It is noted that in this example, the separation unit 120 may enable, based on the configuration information, effective frequency component widths (channel spacings) of the at least one second optical signal obtained through separation to be different, in other words, the optical waveguide apparatus 100 may support output of optical signals with different channel spacings. Certainly, the effective frequency component widths (channel spacings) of the at least one second optical signal obtained by the separation unit 120 through separation may definitely be the same.

In the optical waveguide apparatus provided in this application, because the separation unit is implemented by the variable optical waveguide, based on the configuration information and based on a preset requirement or need, the separation unit may flexibly split, into the frequency component of the at least one second optical signal that needs to be output, the frequency component of the at least one first optical signal dispersed by the first dispersion unit. The optical waveguide apparatus may support different channel spacings (effective frequency component widths), in other words, the frequency component of the at least one first optical signal dispersed by the first dispersion unit may be separated into different at least one second optical signal based on different application requirements or application conditions, in other words, may flexibly separate the frequency component of the at least one first optical signal, and may support different channel spacings, thereby avoiding a case in which one optical waveguide apparatus needs to be disposed for each channel spacing, and improving use efficiency and performance of the optical waveguide apparatus. Therefore, types of the optical waveguide apparatus can be reduced, goods preparation costs can be reduced, and maintenance and management costs of the optical waveguide apparatus can be reduced.

It should be understood that the optical waveguide apparatus may include one or more first dispersion units. When only one first dispersion unit is included, the first dispersion unit may be configured to disperse the frequency component of the at least one first optical signal. When a plurality of first dispersion units are included, each first dispersion unit may disperse a frequency of one first optical signal, or may disperse frequencies of a plurality of first optical signals (for example, implement a function of the cyclic AWG). This is not limited in this application.

Optionally, in an embodiment, the separation unit 120 is further configured to change composition of the frequency component of the at least one second optical signal based on the configuration information.

Specifically, composition or division of a frequency component of an optical channel in each first optical signal changes. For example, a network manager may configure, based on the configuration information, transmitters corresponding to different optical channels to change composition of frequency components of the corresponding optical channels. In this case, the separation unit 120 may be further configured to change composition of the frequency component of the at least one second optical signal based on the configuration information. The composition of the frequency component of the second optical signal may include any one or more pieces of the following information: a center frequency of the second optical signal, a channel spacing of the second optical signal, a frequency grid applicable to the second optical signal, start and end positions of an effective frequency component of the second optical signal, an effective frequency component width of the second optical signal, and the like. For example, it is assumed that the separation unit 120 determines, based on the configuration information, that the frequency component of the first optical signal needs to be separated into two second optical signals whose effective frequency component (maximum) ranges are respectively 193.025 THz to 193.075 THz and 193.125 THz to 193.175 THz, in other words, center frequencies of optical signal channels formed by the separation unit 120 are respectively 193.05 THz and 193.15 THz, and a channel spacing is 50 GHz. When the network manager changes, based on the configuration information, frequency composition of an optical channel sent by the transmitter corresponding to the optical channel in the first optical signal, the separation unit 120 may correspondingly change, based on the configuration information, composition of frequency components of the two second optical signals. For example, center frequencies of the two second optical signals are respectively 193.13125 THz and 193.01875 THz, and effective frequency component widths (channel spacings) of the two second optical signals are respectively 75 GHz and 150 GHz, in other words, maximum effective frequency component ranges are respectively 193.09375 THz to 193.15625 THz and 192.94375 THz to 193.09375 THz. Therefore, the separation unit 120 may change the composition of the frequency component of the at least one second optical signal based on the configuration information. In the foregoing example, the composition of the effective frequency components of the two second optical signals is changed from 193.025 THz to 193.075 THz and 193.125 THz to 193.175 THz to 193.09375 THz to 193.15625 THz and 192.94375 THz to 193.09375 THz. It may be learned that composition of the frequency components such as the center frequencies and effective frequency component widths of the two second optical signals may be changed. The separation unit 120 changes the composition of the frequency component of the at least one second optical signal based on the configuration information, so that the optical waveguide apparatus can output second optical signals with different frequency component composition. Further, use efficiency and performance of the optical waveguide apparatus are improved, and a use range of the optical waveguide apparatus is increased.

Figure 5:
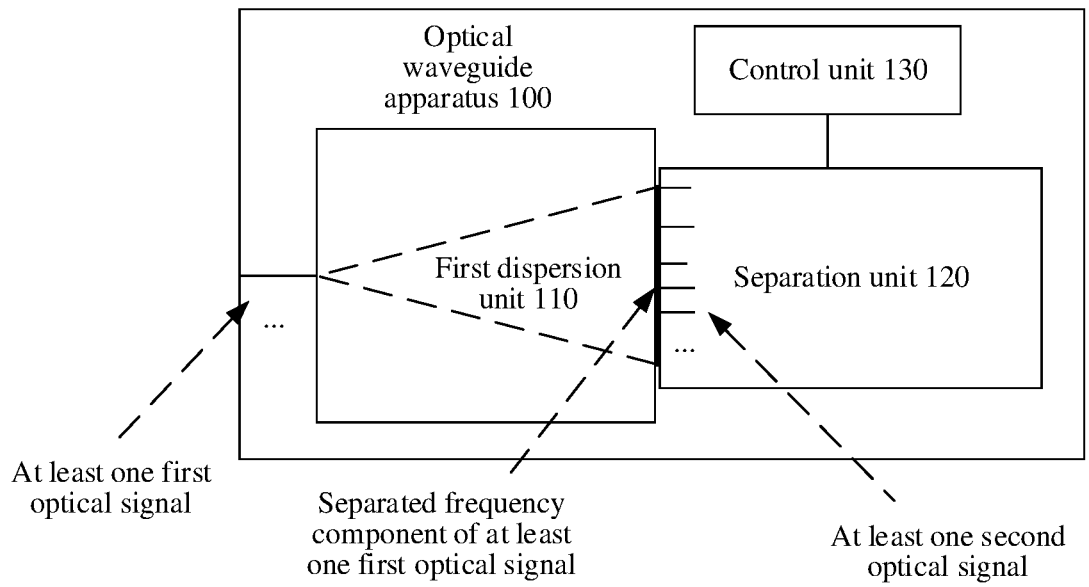
FIG. 5 is a schematic structural block diagram of an optical waveguide apparatus according to another embodiment of this application.

Optionally, in an embodiment, as shown in FIG. 5, the optical waveguide apparatus 100 further includes a control unit 130. The control unit 130 is connected to the separation unit 120, and the control unit 130 is configured to control, based on the configuration information, the separation unit 120 to separate the frequency component of the at least one first optical signal into the at least one second optical signal. Further, the control unit 130 is further configured to control, based on the configuration information, the separation unit 120 to change the composition of the frequency component of the at least one second optical signal.

Specifically, that the separation unit 120 separates the frequency component of the at least one first optical signal into the at least one second optical signal may be completed by the separation unit 120 under the control of the control unit 130 based on the configuration information. The control unit 130 may be alternatively located inside the separation unit 120. The control unit 130 may obtain the configuration information, and control, based on information about the composition of the frequency component of the at least one second optical signal in the configuration information, the separation unit 120 to separate the frequency component of the at least one first optical signal into the at least one second optical signal, or to change the composition of the frequency component of the at least one second optical signal.

It should be understood that the optical waveguide apparatus may include one or more control units. For example, it is assumed that there is one first dispersion unit that may correspond to one control unit or a plurality of control units. When there are a plurality of first dispersion units, there may also be one or more control units. This is not limited in this application.

Optionally, the separation unit 120 includes a liquid crystal material, and the control unit 130 includes at least one electrode. The at least one electrode determines, based on the configuration information, whether to apply a voltage to the at least one electrode (whether to apply a voltage depends on a type of the liquid crystal material), so that a transmission channel of the at least one second optical signal is formed in the liquid crystal material, and the liquid crystal material is controlled to separate the frequency component of the at least one first optical signal into the at least one second optical signal.

Specifically, the separation unit 120 is implemented by a variable optical waveguide, and the variable optical waveguide may be implemented by a liquid crystal material. Therefore, the separation unit 120 may be implemented by using the liquid crystal material. A feature of the liquid crystal material is that a refractive index of some areas of the liquid crystal material can be controlled under the action of an electric field, to implement any one or more of the following functions: forming a required optical waveguide, eliminating a waveguide that is not required, changing a waveguide shape, changing a direction of an optical waveguide, changing transmission performance (for example, a loss value or a refractive index) of an optical waveguide, and the like. The control unit 130 includes an electrode. In other words, the control unit 130 is implemented by the electrode. The control unit 130 (the electrode) may be integrated with the separation unit 120 (for example, integrated in an optical chip). The control unit 130 may use a dot-matrix electrode, and add an electric field to an electrode at a position that is of the liquid crystal material and through which an optical signal needs to pass, so that a refractive index at a required position is greater than a refractive index of another point, thereby forming various optical waveguides in the liquid crystal material. In this way, the control unit 130 can control the separation unit 120 to form a desired optical waveguide in the separation unit, so that the frequency component of the dispersed at least one first optical signal is separated into the at least one second optical signal. Optionally, the control unit 130 may be alternatively separated from the separation unit 120 (the control unit 130 is disposed outside the separation unit 120). In this case, the control unit 130 may be implemented by an electric field generation apparatus.

The configuration information may include information that is used to generate an electric field and that is formed based on composition of a frequency component of each of the at least one second optical signal, for example, a voltage value applied to the electrode, and an electrode whose voltage needs to be changed. When the separation unit 120 is a liquid crystal material and the control unit 130 is an electrode, the configuration information includes a voltage application manner of a corresponding dot-matrix electrode and/or an electrode whose voltage needs to be changed. A corresponding voltage is applied to a dot-matrix electrode corresponding to a preset area of the liquid crystal material (or a corresponding voltage is not applied, and whether to apply a voltage depends on a type of the liquid crystal material), so that a refractive index of the preset area is greater than a refractive index of another area of the liquid crystal material, and the optical signal transmission channel can be formed in the preset area. When positions or shapes of the preset area are different, various optical processing functions can be implemented, for example, an optical signal transmission channel function, a function of changing a shape of an optical signal transmission channel, and the like can be implemented. The control unit 130 may determine, based on the configuration information, an electrode to which a voltage needs to be applied, to control the separation unit 120 to separate the frequency component of the dispersed at least one first optical signal into the at least one second optical signal, to form a transmission channel of the at least one second optical signal.

Figure 6:
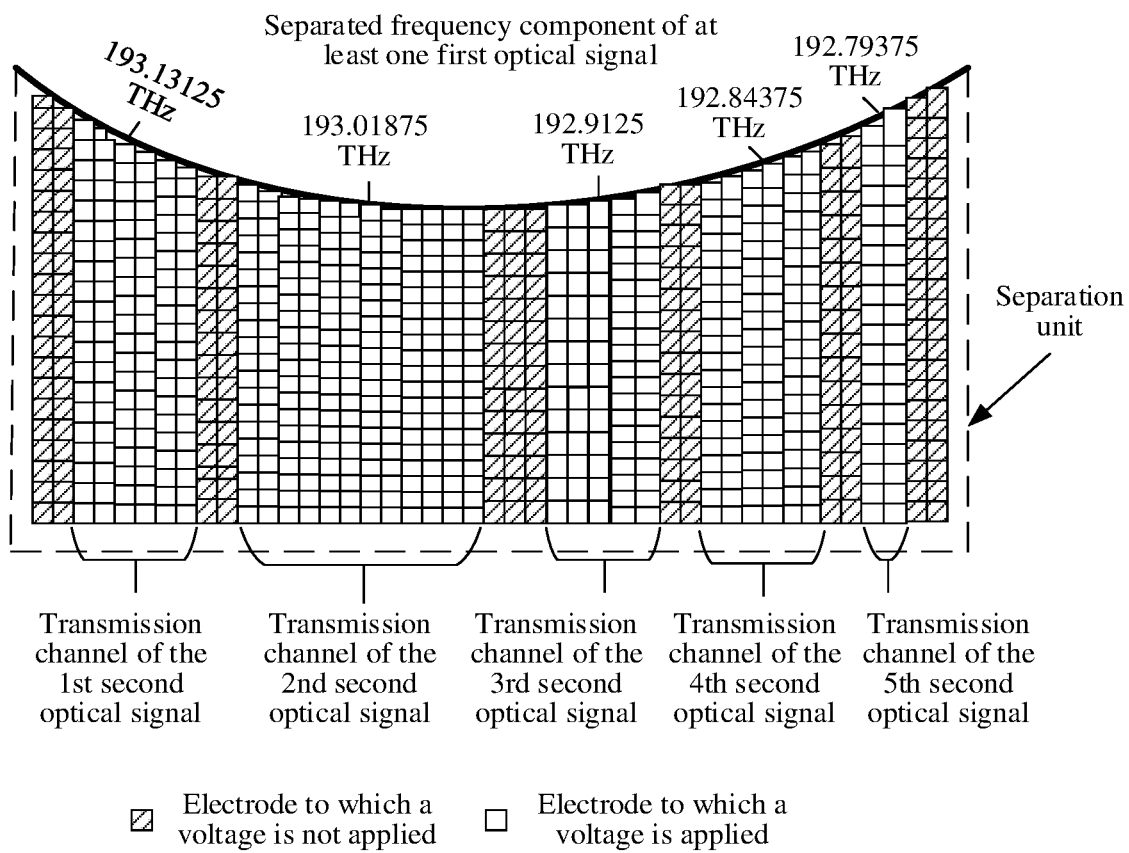
FIG. 6 is a schematic diagram in which a control unit controls a separation unit to separate a frequency component of a first optical signal into at least one second optical signal according to an embodiment of this application.

FIG. 6 is a schematic diagram in which a control unit (an electrode) controls a separation unit to separate a frequency component of a first optical signal into at least one second optical signal according to an embodiment of this application. As shown in FIG. 6, after a first dispersion unit separates a frequency component of at least one first optical signal, a plurality of control units may determine, based on configuration information, whether to apply a voltage to the electrode to form a transmission channel for outputting the at least one second optical signal. Specifically, that the separation unit separates the frequency component of the first optical signal into the at least one second optical signal mainly includes two parts. A first part is that a control unit that is close to a position at which the first dispersion unit disperses the frequency component of the input at least one first optical signal determines, based on the configuration information, whether to apply a voltage (or not to apply a voltage) to the control unit, to control the separation unit to separate or split the frequency component of the at least one first optical signal dispersed by the first dispersion unit. In this embodiment, the position at which the first dispersion unit disperses the frequency component of the input at least one first optical signal is a part of are close to the separation unit on a Rowland circle of an output coupling area. After the separation unit separates or splits the frequency component of the at least one first optical signal dispersed by the first dispersion unit, the frequency component obtained after the separation or splitting can theoretically form at least one second optical signal, so that the separation unit separates, into the at least one second optical signal, the frequency component of the at least one first optical signal dispersed by the first dispersion unit. However, in actual implementation, the frequency component obtained after the separation or splitting further needs to be transmitted to a corresponding output port. Therefore, a second part may be added (in other words, the second part is not mandatory). In addition, it should be noted that the first dispersion unit only disperses the frequency component of the at least one first optical signal, and does not separate or split the frequency component of the at least one first optical signal. The separation or splitting is completed by the separation unit. The second part is that a control unit on a corresponding path determines, based on the configuration information, whether to apply a voltage (or not apply a voltage) to the control unit, to control the separation unit to transmit, to a corresponding output port, a frequency component of the at least one first optical signal that is separated or split, so that the separation unit separates, into the at least one second optical signal, the frequency component of the at least one first optical signal dispersed by the first dispersion unit. The output port may be an interface of an output optical fiber, an output unit, or an internal interface of the optical waveguide apparatus. The corresponding path is a path between separated or dispersed frequency components corresponding to the at least one second optical signal and an output port corresponding to the at least one second optical signal. For example, as shown in FIG. 6, a plurality of electrodes may not apply a voltage to an electrode in an area between a transmission channel of a $1^{st}$ second optical signal and a transmission channel of a $2^{nd}$ second optical signal based on the configuration information. That no voltage is applied to the electrode means that an optical signal may not pass through the electrode, in other words, selective passage of the optical signal is implemented, so that the transmission channel of the $1^{st}$ second optical signal and the transmission channel of the $2^{nd}$ second optical signal are separated from each other, and a voltage is applied to electrodes in areas corresponding to the $1^{st}$ second optical signal and the $2^{nd}$ second optical signal, so that the optical signal can pass through, and transmission channels through which the $1^{st}$ second optical signal and the $2^{nd}$ second optical signal can separately pass may be formed. For example, a maximum effective frequency component range of the $1^{st}$ second optical signal is 193.09375 THz to 193.15625 THz, and a maximum effective frequency component range of the $2^{nd}$ second optical signal is 192.94375 THz to 193.09375 THz. In other words, a channel spacing (a maximum effective frequency component width) of the $1^{st}$ second optical signal is 75 GHz, and a channel spacing (or a maximum effective frequency component width) of the $2^{nd}$ second optical signal is 150 GHz. In actual application, a filter spectrum of a module that implements optical signal multiplexing, demultiplexing or add/drop multiplexing cannot be completely rectangular. To prevent crosstalk between adjacent optical signals, a specific frequency width needs to be reserved between adjacent optical signals, and the specific frequency width is allowed to be blocked by the module. The frequency width allowed to be blocked between the adjacent optical signals is usually 1 GHz. Therefore, in this embodiment, a control unit whose corresponding frequency range is 193.09325 THz to 193.09425 THz is selected from the control unit close to the position at which the first dispersion unit disperses the frequency component of the input at least one first optical signal, and no voltage is applied to the control unit, to separate the $1^{st}$ second optical signal from the $2^{nd}$ second optical signal. Apparently, a control unit whose corresponding frequency range is 193.09425 THz to 193.15575 THz is selected from the control unit close to the position at which the first dispersion unit disperses the frequency component of the input at least one first optical signal, and a voltage is applied to the control unit, to transmit the $1^{st}$ second optical signal; and a control unit whose corresponding frequency range is 192.94425 THz to 193.09325 THz is selected, and a voltage is applied to the control unit, to transmit the $2^{nd}$ second optional signal. Similarly, for a $3^{rd}$ second optical signal to a 5th second optical signals, no voltage is applied to an electrode in a spacing area between transmission channels of two adjacent second optical signals, but a voltage is applied to an electrode at an interval corresponding to each transmission channel of the second optical signal, so that a transmission channel for outputting the corresponding second optical signal is formed.

It should be understood that, in FIG. 6, a voltage is applied to the control unit (or no voltage is applied) to control a transmission channel of the at least one second optical signal formed by the separation unit to be linear, in other words, an optical waveguide formed in the separation unit is straight. Optionally, the transmission channel (or the waveguide) formed in the separation unit may be another shape such as a wedge shape or a curved shape. This is not limited in this embodiment of this application.

It should be further understood that the separation unit 120 may alternatively include a magnetic fluid material, in other words, a magnetic field may be used to change a refractive index of a preset area of the separation unit 120, so that the refractive index of the preset area is greater than a refractive index of another area of the separation unit 120, and an optical signal transmission channel may be formed in the preset area. The control unit 130 may be a magnet, and the separation unit 120 may form, under the action of a magnetic field generated by the control unit 130, a transmission channel through which the at least one second optical signal separately passes. In this case, the control unit 130 may not be disposed inside the optical waveguide apparatus 100, in other words, may be separated from the optical waveguide apparatus 100. The configuration information may be strength of the magnetic field. This is not limited in this application.

It should be further understood that the control unit 130 may alternatively change the refractive index of the preset area in a temperature control manner, to implement a variable optical waveguide. The configuration information is correspondingly information such as temperature. This is not limited in this application.

It should be further understood that the separation unit 120 may be alternatively implemented by another material with a variable refractive index. The first dispersion unit 110 may be implemented by a variable optical waveguide, or may be implemented by a fixed optical waveguide. This is not limited in this application.

Optionally, in an embodiment, a frequency width allowed to be blocked between adjacent second optical signals in the at least one second optical signal is greater than or equal to a frequency width corresponding to any one of the at least one electrode.

Specifically, a first width at a position at which the first dispersion unit disperses the frequency component of the input at least one first optical signal is greater than or equal to a width of any one of the at least one electrode. The first width corresponds to the frequency width allowed to be blocked between adjacent second optical signals in the at least one second optical signal. FIG. 6 is used as an example. It is assumed that a maximum effective frequency component range of the $1^{st}$ second optical signal is 193.09375 THz to 193.15625 THz, and a maximum effective frequency component range of the $2^{nd}$ second optical signal is 192.94375 THz to 193.09375 THz. If the $1^{st}$ second optical signal and the $2^{nd}$ second optical signal need to be split, at the position at which the first dispersion unit disperses the frequency component of the input at least one first optical signal, a width that is at the position and that corresponds to a frequency width allowed to be blocked between the $1^{st}$ second optical signal and the $2^{nd}$ second optical signal needs to be greater than or equal to the width of the electrode, in other words, at least a next electrode can be placed in an area, at the position, corresponding to a frequency spacing allowed to be blocked between the $1^{st}$ second optical signal and the $2^{nd}$ second optical signal, so that the $1^{st}$ second optical signal and the $2^{nd}$ second optical signal can be split. It is assumed that a frequency width allowed to be blocked between adjacent optical signals is 1 GHz, and two rows of electrodes can be placed at a width corresponding to 1 GHz at the position at which the first dispersion unit disperses the frequency component of the input at least one first optical signal. The two rows of electrodes are configured to separate the $1^{st}$ second optical signal and the $2^{nd}$ second optical signal, and no voltage is applied to the two rows of electrodes, so that optical signal transmission can be prevented. Therefore, only when a first width at the position at which the first dispersion unit disperses the frequency component of the input at least one first optical signal is not less than a width of one electrode, the electrode can separate two adjacent second optical signals in the at least one second optical signal, to form an output channel for outputting each second optical signal.

For example, it is assumed that the first dispersion unit disperses the frequency component of the at least one first optical signal to a Rowland circle of an output coupling area of an AWG, and the following formula may be obtained from formula (6):

$$\Delta\theta_o = m*\Delta\lambda/n_{so}*d_o \tag{7}$$

Therefore, a width $\Delta w$ of a frequency domain spacing between two adjacent second optical signals may be obtained as follows:

$$\Delta w = 2R*\Delta\theta_0 = 2R*m*\Delta\lambda/n_{so}*d_o \tag{8}$$

In formula (8), R is a radius of a Rowland circle, and for an optical signal, $f=c/n*\lambda$, where f is a frequency, n is a refractive index of a waveguide in which the optical signal is located, c is a speed of light, and X is an optical signal wavelength. Therefore, formula (9) may be obtained.

$$\Delta\lambda = -c*\Delta f/f^2*n \tag{9}$$

Formula (9) is substituted to formula (8) to obtain:

$$|\Delta w| = 2R*m*c*\Delta f/n_{so}^2*d_o*f^2 \geq \Delta g \tag{10}$$

In formula (10), $\Delta g$ is a minimum width corresponding to the electrode, and $\Delta f$ is a frequency width allowed to be blocked between adjacent optical signals. If $\Delta f$ is 1 GHz, f is 191.2 THz, and $n_{so}$ is 1.5, $2R*m/\Delta g*d_o \geq 2.7*10^5$. In an actual example of the AWG, 2R=3600 um, m=100, and $d_o$=10 um. Therefore, it can be estimated that $\Delta g \leq 0.13$ (μm). Currently, a minimum electrode size of the liquid crystal material is approximately 3 um. Therefore, $2R*m/\Delta g*d_o$ needs to be increased by more than one order of magnitude than a value that is currently commonly used, and a value of $\Delta g$ may be reduced or a value of $2R*m/d_o$ may be increased. It is more practical to substantially reduce $d_o$. For example, if $\Delta g$=1 um, $d_o$=2 um, 2R=7200 um, and m=150, formula (10) may be met, and two electrodes can be placed at a width that is on the Rowland circle of the output coupling area of the AWG and that corresponds to a frequency width allowed to be blocked between two adjacent second optical signals.

It should be understood that sizes of different electrodes in the at least one electrode may be the same or may be different. Therefore, that the frequency width allowed to be blocked between adjacent second optical signals in the at least one second optical signal is greater than or equal to the frequency width corresponding to any one of the at least one electrode may be understood as: A frequency width corresponding to each of the at least one electrode is less than the frequency width allowed to be blocked between adjacent second optical signals in the at least one second optical signal; or may be understood as: A frequency width corresponding to one of the at least one electrode is less than the frequency width allowed to be blocked between adjacent second optical signals in the at least one second optical signal. This is not limited in this application.

Figure 7:
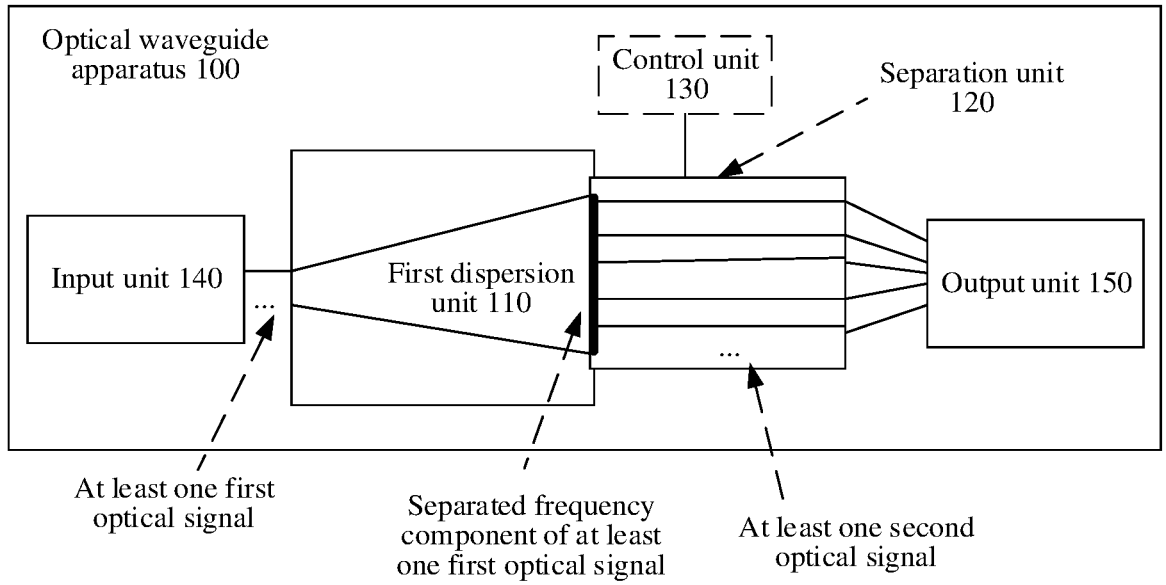
FIG. 7 is a schematic structural block diagram of an optical waveguide apparatus according to another embodiment of this application.

Optionally, in an embodiment, as shown in FIG. 7, the optical waveguide apparatus 100 further includes an input unit 140 and an output unit 150, the input unit 140 is connected to the first dispersion unit 110, the input unit 110 is configured to transmit the at least one first optical signal to the first dispersion unit 110, the output unit 150 is connected to the separation unit 120, and the output unit 150 is configured to output the at least one second optical signal.

Specifically, as shown in FIG. 7, the optical waveguide apparatus 100 further includes the input unit 140 and the output unit 150. The input unit 140 is configured to transmit the at least one first optical signal to the first dispersion unit 110. The output unit 140 is configured to output the at least one second optical signal. The input unit 140 may be an input waveguide. An input optical fiber transmits the at least one first optical signal to the input waveguide. The input waveguide transmits the at least one first optical signal to the first dispersion unit 110. Alternatively, the input unit 140 may be an input optical fiber, and the at least one first optical signal is directly transmitted to the first dispersion unit by using the input optical fiber. There may be a plurality of input waveguides or input optical fibers, and each input waveguide or each input optical fiber is configured to transmit one first optical signal. Similarly, the output unit 150 may be an output waveguide or an output optical fiber. There may be a plurality of output waveguides or output optical fibers, and each output waveguide or each output optical fiber is configured to output one second optical signal. Optionally, the optical waveguide apparatus 100 further includes a control unit 130.

It should be understood that the input unit 140 and the output unit 150 may alternatively be other parts or structural units that may transmit the optical signal. This is not limited in this application.

Optionally, the first dispersion unit includes an arrayed waveguide or a concave grating.

Specifically, the first dispersion unit 110 may implement a dispersion function. Optionally, the first dispersion unit may be a part of the AWG. For example, the first dispersion unit may include an input coupling area, an arrayed waveguide, and an output coupling area of the AWG, and a core part of the first dispersion unit is the arrayed waveguide. The first dispersion unit may alternatively include only the arrayed waveguide. In addition, the first dispersion unit may also be a part of an etched diffraction grating (etched diffraction grating, EDG). For example, the first dispersion unit may include a coupling area and a concave grating in the EDG, and a core part of the first dispersion unit is the concave grating. The first dispersion unit may alternatively include only the concave grating. An example in which the first dispersion unit 110 may include an input coupling area, an arrayed waveguide area, and an output coupling area is used for description. Both the input coupling area and the output coupling area are of a Rowland circle structure. The first dispersion unit 110 may disperse the frequency component of the at least one first optical signal at a position of an are that is on the Rowland circle of the output coupling area and that is adjacent to the separation unit 120. The separation unit 120 may separate, based on the configuration information, the frequency component of the at least one first optical signal into the at least one second optical signal from the position at which the first dispersion unit 110 disperses the frequency component of the at least one first optical signal.

It should be understood that the first dispersion unit 110 may further include another part or include another structure, provided that the dispersion function can be implemented, in other words, provided that the frequency component of the at least one first optical signal is dispersed. This is not limited in this embodiment of this application.

Figure 8:
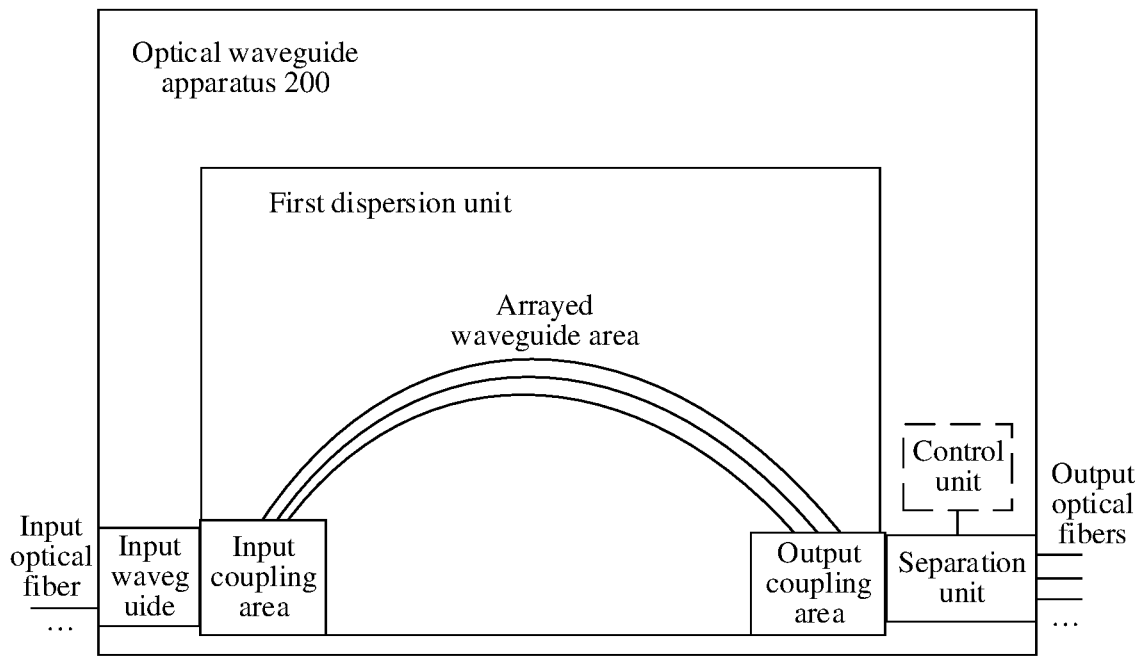
FIG. 8 is a schematic structural block diagram of an optical waveguide apparatus according to another embodiment of this application.

FIG. 8 is a schematic structural diagram of an optical waveguide apparatus 200 according to an embodiment of this application. For example, FIG. 8 may be a top view of a schematic structure of the waveguide apparatus 200. As shown in FIG. 8, the optical waveguide apparatus 200 includes an input waveguide (an input unit), a first dispersion unit, and a separation unit. An input optical fiber is configured to transmit at least one first optical signal to the input waveguide, the input waveguide transmits the at least one first optical signal to the first dispersion unit, and the first dispersion unit includes an input coupling area, an arrayed waveguide area, and an output coupling area, and can complete a dispersion function. The first dispersion unit disperses a frequency component of the at least one first optical signal at a position on a Rowland circle of the output coupling area. The separation unit separates the frequency component of the at least one first optical signal into the at least one second optical signal based on configuration information, or changes composition of a frequency component of the at least one second optical signal. An output optical fiber outputs the at least one second optical signal. Optionally, the optical waveguide apparatus 200 may further include a control unit, and the control unit may be an electrode or the like. The control unit is configured to control the separation unit to separate the frequency component of the at least one first optical signal into the at least one second optical signal based on the configuration information, or to change the composition of the frequency component of the at least one second optical signal.

It should be understood that FIG. 8 is merely an example, and does not limit a structure of the optical waveguide apparatus 200. For example, the optical waveguide apparatus 200 may further include another structural unit. The first dispersion unit may alternatively be a concave grating in a similar EDG. This is not limited in this application.

Figure 9:
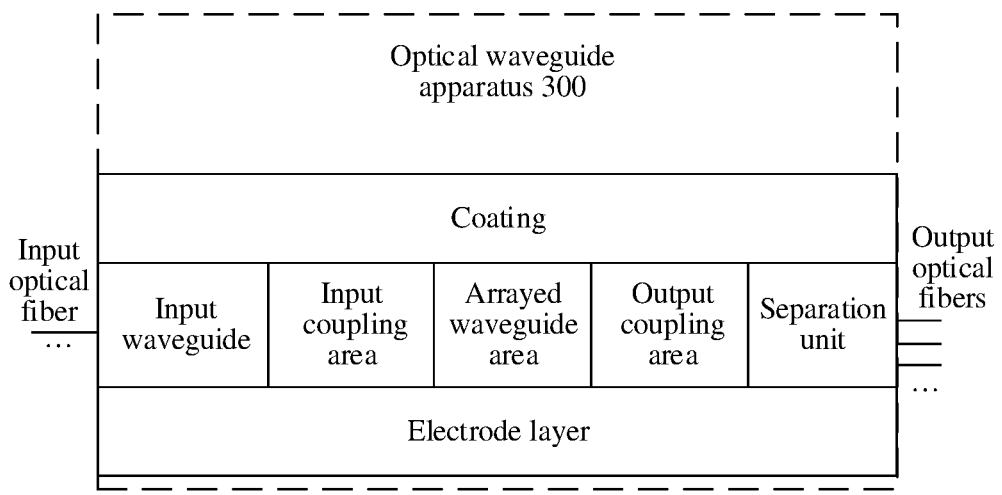
FIG. 9 is a schematic structural block diagram of an optical waveguide apparatus according to another embodiment of this application.

FIG. 9 is a schematic structural diagram of an optical waveguide apparatus 300 according to an embodiment of this application. For example, FIG. 9 may be a front view of a schematic structure of the optical waveguide apparatus 300. As shown in FIG. 9, the optical waveguide apparatus 300 includes an input waveguide, a first dispersion unit (including an input coupling area, an arrayed waveguide area, and an output coupling area), a separation unit, a coating, and an electrode layer (a control unit). An input optical fiber is configured to transmit at least one first optical signal to the input waveguide. The input waveguide transmits the at least one first optical signal to the input coupling area, and the at least one first optical signal passes through the arrayed waveguide area and the output coupling area, to disperse a frequency component of the at least one first optical signal at a corresponding position on a Rowland circle of the output coupling area. The electrode layer (the control unit) may be a dot-matrix electrode, and is mainly configured to provide a voltage. The separation unit separates, under the control of the electrode layer and based on configuration information, the frequency component of the at least one first optical signal into at least one second optical signal by applying a voltage to an electrode at the electrode layer. An output optical fiber is configured to output the at least one second optical signal. The coating is mainly a material that seals the separation unit and whose refractive index is variable, and generally uses an indium tin oxide (ITO) glass substrate. The coating may also be used as a ground layer, and provides a required voltage together with the electrode layer. In addition, an electrode may be added to the coating, so that the coating may be used as an electrode layer.

It should be understood that FIG. 9 is merely an example, and does not limit a structure of the optical waveguide apparatus 300. For example, the electrode layer may be located only outside the separation unit. Alternatively, the optical waveguide apparatus 200 may further include another structural unit or the like. This is not limited in this application.

Optionally, at least one of the at least one first optical signal includes a plurality of optical channels.

Specifically, the separation unit 120 may separate the frequency component of the at least one first optical signal into the at least one second optical signal. Therefore, at least one of the at least one first optical signal may include a plurality of optical channels. In other words, the optical waveguide apparatus in this application may implement a function of an optical signal demultiplexer, and support transmission of optical signals with different channel spacings, thereby improving efficiency and use performance of the optical waveguide apparatus.

It should be understood that some first optical signals in the at least one first optical signal may include a plurality of optical channels. In other words, some first optical signals in a plurality of first optical signals may include a plurality of optical channels, and some first optical signals may include only one optical channel. This is not limited in this application.

It should be further understood that each second optical signal of the at least one second optical signal may include only one optical channel. Alternatively, some second optical signals in the at least one second optical signal may include a plurality of optical channels, and some second optical signals may include only a single optical channel. This is not limited in this application.

Figure 10:
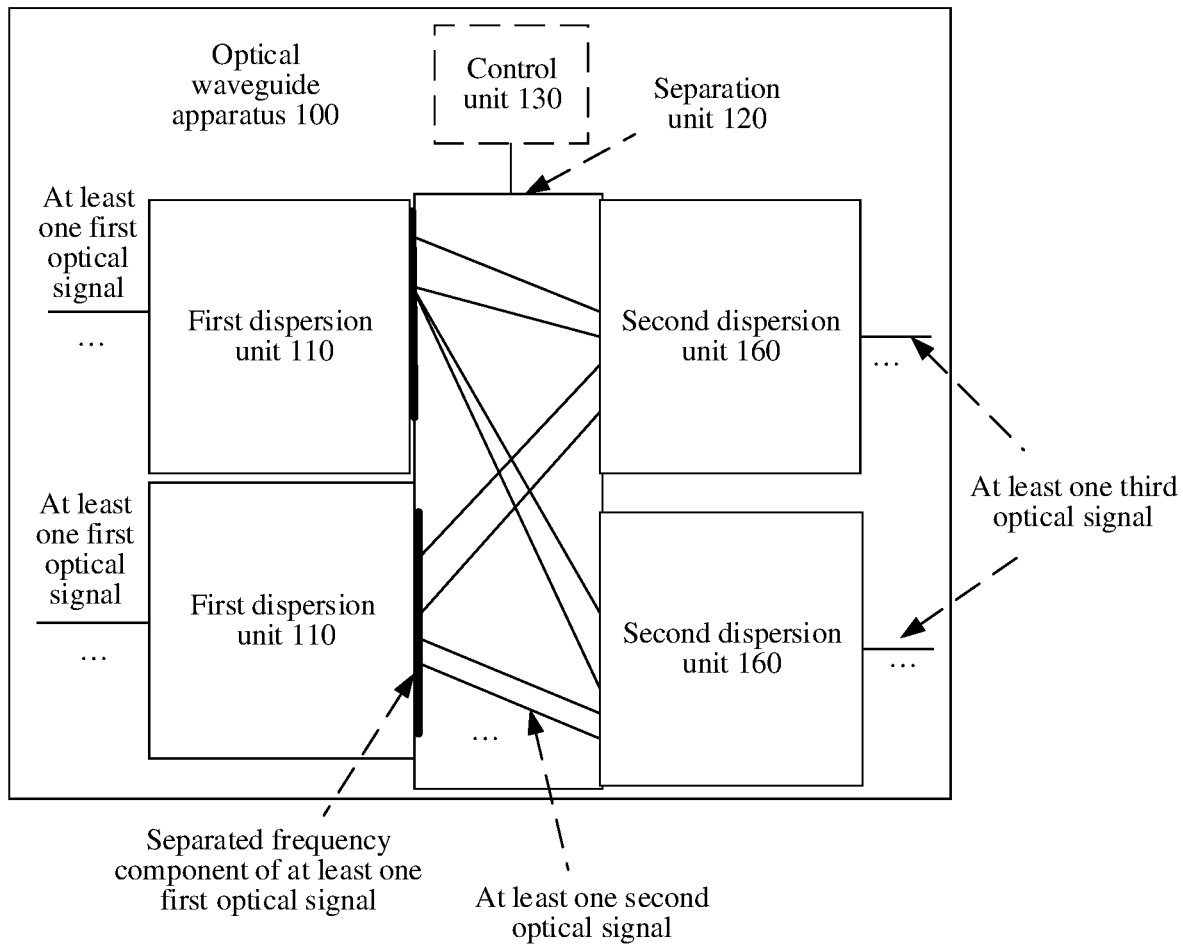
FIG. 10 is a schematic structural block diagram of an optical waveguide apparatus according to another embodiment of this application.

Optionally, as shown in FIG. 10, the optical waveguide apparatus 100 further includes a second dispersion unit 160, the second dispersion unit 160 is connected to the separation unit 120, the separation unit 120 is further configured to transmit at least some second optical signals in the at least one second optical signal to the second dispersion unit 160 based on the configuration information, and the second dispersion unit 160 is configured to combine the some second optical signals into at least one third optical signal.

Specifically, as shown in FIG. 10, the optical waveguide apparatus 100 further includes the second dispersion unit 160. In an example shown in FIG. 10, two second dispersion units 160 are included. In this embodiment of this application, the optical waveguide apparatus 100 may include only one second dispersion unit 160, or may include more second dispersion units 160. The second dispersion unit 160 may implement a dispersion function. The separation unit 120 is further configured to transmit at least some second optical signals in the at least one second optical signal to the second dispersion unit 160 based on the configuration information. Optionally, the optical waveguide apparatus 100 may further include a control unit 130. The control unit 130 is configured to: based on the configuration information, control the separation unit 120 to separate the frequency component of the at least one first optical signal into the at least one second optical signal, and control the separation unit 120 to transmit at least some second optical signals in the at least one second optical signal to the second dispersion unit 160. As shown in FIG. 10, there are eight second optical signals in total. The separation unit 120 separately transmits four second optical signals to one second dispersion unit 160 based on the configuration information, and transmits the other four paths to the other second dispersion unit 160. The second dispersion unit 160 may implement a dispersion function, in other words, may combine, into at least one third optical signal, at least one second optical signal transmitted to the second dispersion unit 160. In the example shown in FIG. 10, each second dispersion unit 160 can combine four second optical signals into one third optical signal. The optical waveguide apparatus 100 may further output the at least one third optical signal. Because a plurality of second optical signals may be different optical signals, the separation unit 120 may transmit at least one second optical signal with different frequency components to a same second dispersion unit 160, thereby implementing hybrid transmission and exchanging of second optical signals with different frequency components, in other words, implementing hybrid transmission and exchanging of optical signals with different channel spacings, in other words, the waveguide apparatus implements a function that can be implemented by a flexible WSS. Therefore, performance and efficiency of the optical waveguide apparatus are improved.

It should be understood that the at least one third optical signal may include a plurality of optical channels, or may include only one optical channel. Alternatively, some include a plurality of optical channels, and some include only a single optical channel. This is not limited in this application.

It should be further understood that FIG. 10 is merely an example, and does not limit a structure of the optical waveguide apparatus. For example, the optical waveguide apparatus may alternatively include more first dispersion units and/or second dispersion units. The first optical signal, the second optical signal, and the third optical signal may further include more paths. The optical waveguide apparatus may further include an output unit. The at least one second optical signal obtained by the first dispersion unit or some first dispersion units through separation may be directly output (being connected to the output unit) without being connected to the second dispersion unit. This is not limited in this application.

It should be further understood that a structure of the second disperse unit may be similar to a structure of the first dispersion unit. For example, the second dispersion unit includes an arrayed waveguide or a concave grating. Specifically, the second dispersion unit may include an input coupling area, an arrayed waveguide area, an output coupling area, and the like. This is not limited in this application.

Figure 11:
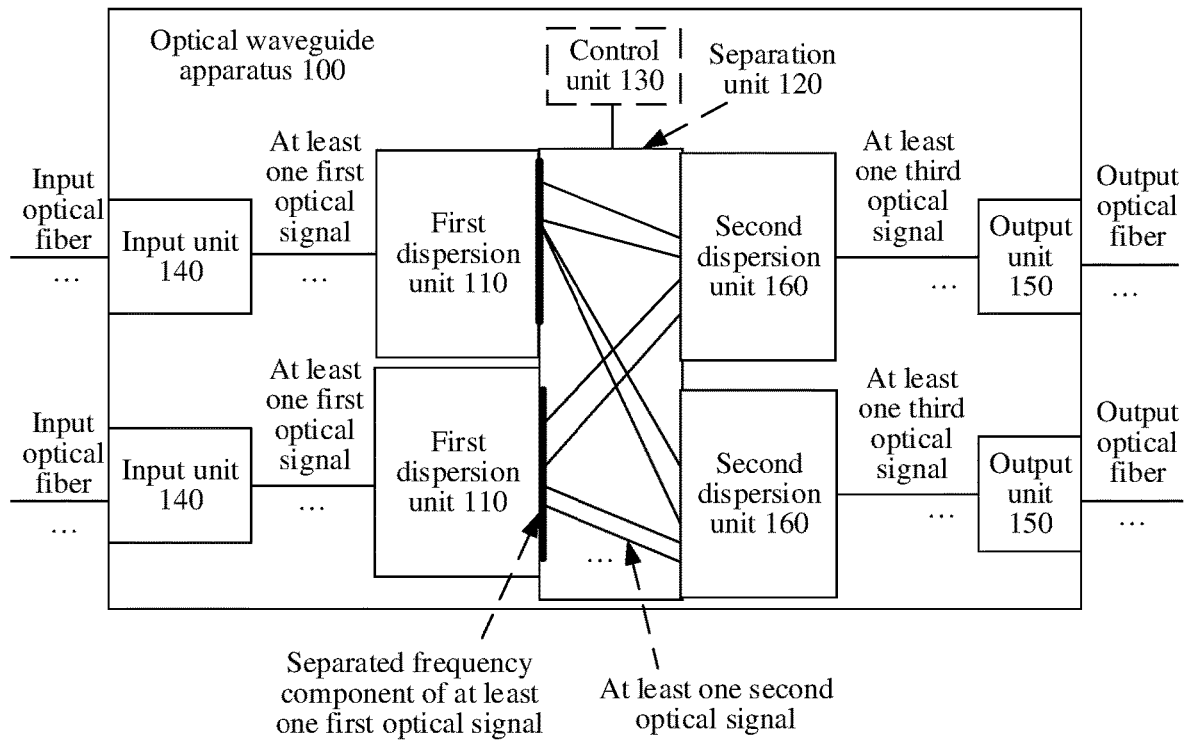
FIG. 11 is a schematic structural block diagram of an optical waveguide apparatus according to another embodiment of this application.

Optionally, as shown in FIG. 11, the optical waveguide apparatus 100 further includes an input unit 140 and an output unit 150. The input unit 140 is connected to the first dispersion unit 110. An input optical fiber transmits at least one first optical signal to the input unit. The input unit 110 is configured to transmit the at least one first optical signal to the first dispersion unit 110. The first dispersion unit 110 disperses a frequency of the at least one first optical signal input to the first dispersion unit 110. The separation unit 120 separates a frequency component of the at least one first optical signal into at least one second optical signal based on the configuration information, and transmits at least some second optical signals in the at least one second optical signal to the second dispersion unit 160. The second dispersion unit 160 may combine, into at least one third optical signal, at least one second optical signal transmitted to the second dispersion unit. The output unit 150 is connected to the second dispersion unit 160, and the output unit 150 is configured to output the at least one third optical signal. The at least one third optical signal is transmitted to an output optical fiber.

The foregoing mainly describes a process in which the optical waveguide apparatus is used as a demultiplexer to separate optical signals. The following describes a process in which the optical waveguide apparatus is used as a combiner to synthesize optical signals. It should be understood that a process of synthesizing optical signals is an inverse process of a process of separating optical signals. For similar descriptions, refer to the foregoing similar descriptions of the optical waveguide apparatus 100 to the optical waveguide apparatus 300.

Figure 12:
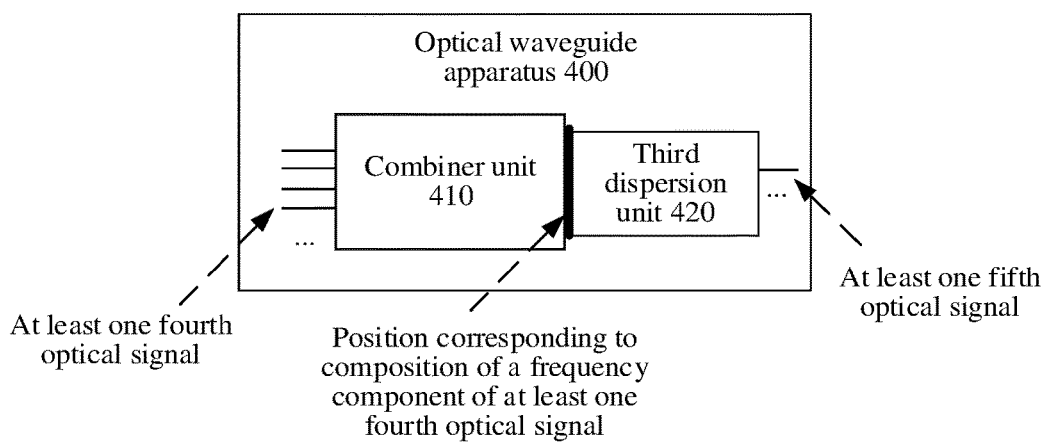
FIG. 12 is a schematic structural block diagram of an optical waveguide apparatus according to an embodiment of this application.

FIG. 12 is a schematic structural diagram of an optical waveguide apparatus according to an embodiment of this application. As shown in FIG. 12, the optical waveguide apparatus 400 includes a combiner unit 410 and a third dispersion unit 420.

The combiner unit 410 is connected to the third dispersion unit 420. The combiner unit is configured to transmit, based on configuration information, at least one fourth optical signal to a position corresponding to composition of a frequency component of the at least one fourth optical signal, and the third dispersion unit 420 is configured to combine the at least one fourth optical signal into at least one fifth optical signal from the position corresponding to the composition of the frequency component of the at least one fourth optical signal. The combiner unit is implemented by a variable optical waveguide, and the variable optical waveguide is an optical waveguide that implements at least one of the following functions based on the configuration information: forming an optical signal transmission channel, eliminating the optical signal transmission channel, and changing a shape of the optical signal transmission channel.

Specifically, as shown in FIG. 12, because the combiner unit 410 is implemented by a variable optical waveguide, the combiner unit 410 may implement any one or more of the following functions: forming an optical waveguide, eliminating an optical waveguide, and changing a shape of an optical waveguide. In other words, the combiner unit 410 may implement a function such as forming an optical signal transmission channel, eliminating an optical signal transmission channel, or changing a shape of an optical signal transmission channel. The combiner unit 410 may transmit, based on the configuration information, the at least one fourth optical signal to the position corresponding to the composition of the frequency component of the at least one fourth optical signal. In other words, the combiner unit 410 may form a preset transmission channel of each of the at least one fourth optical signal based on the configuration information. The transmission channel of each fourth optical signal is used to transmit the fourth optical signal, and finally, the at least one fourth optical signal is sent to the position corresponding to the composition of the frequency component of the at least one fourth optical signal. The position corresponding to the composition of the frequency component of the at least one fourth optical signal may be a corresponding position on a Rowland circle of a coupling area of the third dispersion unit 420. A frequency component of each of the at least one fourth optical signal may be different, in other words, frequency domain of the at least one fourth optical signal does not overlap.

The third dispersion unit 420 may combine the at least one fourth optical signal into the at least one fifth optical signal at the position corresponding to the composition of the frequency component of the at least one fourth optical signal. In other words, the third dispersion unit 420 may implement a dispersion function, and may combine a plurality of optical signals that include different frequency components into one or more optical signals including a plurality of optical channels.

It should be understood that there may be one or more fourth optical signals. When there is only one fourth optical signal, the combiner unit 410 may form a transmission channel of the fourth optical signal based on the configuration information, and transmit the fourth optical signal to a position corresponding to composition of a frequency component of the fourth optical signal. The third dispersion unit 420 may obtain the fourth optical signal from the position corresponding to the composition of the frequency component of the fourth optical signal. In other words, when there is only one fourth optical signal, the fifth optical signal and the fourth optical signal are the same, and are a same optical signal. A function of the third dispersion unit 420 is to obtain the fourth optical signal from the position corresponding to the composition of the frequency component of the fourth optical signal and output the fourth optical signal.

The configuration information may be pre-stored in the optical waveguide apparatus, or may not be stored in the optical waveguide apparatus, and is used when the combiner unit 410 needs to transmit at least one fourth optical signal to a position corresponding to composition of a frequency component of the at least one fourth optical signal. The configuration information may include composition of a frequency component of each of the at least one fourth optical signal. In other words, the configuration information may be any one or more of the following: a preset effective frequency component width (referred to as a "frequency domain width" for short) of each fourth optical signal in at least one fourth optical signal that needs to be transmitted, a maximum effective frequency component width, start and end positions of an effective frequency component, a channel spacing, a center frequency, and a nominal center frequency, or may include a frequency grid that needs to be met by the at least one fourth optical signal. The combiner unit 410 may flexibly form, based on the configuration information, a transmission channel for transmitting each fourth optical signal, in other words, based on preset composition of each fourth optical signal, and transmit each fourth optical signal to a position corresponding to composition of a frequency component of the fourth optical signal. The composition of the frequency component of each fourth optical signal may be different. In other words, the combiner unit 410 may flexibly form, based on the configuration information, a transmission channel for transmitting the at least one fourth optical signal. An effective frequency component width and start and end positions of an effective frequency component of each transmission channel may be flexibly set based on the configuration information. An effective frequency component width or a channel spacing of each transmission channel may be different, and the effective frequency component width or the channel spacing of each transmission channel may be changed. The combiner unit 410 forms, based on the configuration information, transmission channels that are separately used to transmit a plurality of fourth optical signals with different frequency components, and transmits the plurality of fourth optical signals to positions corresponding to composition of the frequency components of the plurality of fourth optical signals. The channel spacing may also be flexibly changed, in other words, output of optical signals with different channel spacings may be supported.

In the optical waveguide apparatus provided in this application, because the combiner unit is implemented by a variable optical waveguide, the combiner unit may implement any one or more of the following functions: forming an optical waveguide, eliminating an optical waveguide, and changing a shape of an optical waveguide. In other words, the combiner unit may implement a function such as forming an optical signal transmission channel, eliminating an optical signal transmission channel, or changing a shape of an optical signal transmission channel. The combiner unit may flexibly form, based on the configuration information, a transmission channel for transmitting the at least one fourth optical signal, and transmit the at least one fourth optical signal to the position corresponding to the composition of the frequency component of the at least one fourth optical signal. The third dispersion unit may combine the at least one fourth optical signal into the at least one fifth optical signal from the position corresponding to the composition of the frequency component of the at least one fourth optical signal. The optical waveguide apparatus may support different channel spacings, in other words, the optical waveguide apparatus may form, based on composition of frequency components of different fourth optical signals, a transmission channel that can be used to transmit the different fourth optical signals, thereby avoiding a case in which one optical waveguide apparatus needs to be disposed for each channel spacing, and improving use efficiency and performance of the optical waveguide apparatus. Therefore, types of the optical waveguide apparatus can be reduced, goods preparation costs can be reduced, and maintenance and management costs of the optical waveguide apparatus can be reduced.

It should be understood that the waveguide apparatus may include one or more third dispersion units. When a plurality of third dispersion units are included, each third dispersion unit may combine the at least one fourth optical signal into the at least one fifth optical signal at the position corresponding to the composition of the frequency component of the at least one fourth optical signal. This is not limited in this application.

Optionally, in an embodiment, the combiner unit is further configured to change the composition of the frequency component of the at least one fourth optical signal based on the configuration information.

Specifically, frequency components of different fourth optical signals may be different. Therefore, the combiner unit needs to form, based on the configuration information, transmission channels for transmitting the different fourth optical signals. Alternatively, for a same fourth optical signal, due to different actual requirements or different transmission cases, the combination unit needs to change composition of a frequency component of the fourth optical signal at different transmission moments based on the configuration information. The composition of the frequency component of the fourth optical signal may include any one or more pieces of the following information: a center frequency of the fourth optical signal, a channel spacing of the fourth optical signal, a frequency grid applicable to the fourth optical signal, start and end positions of an effective frequency component of the fourth optical signal, an effective frequency component width of the fourth optical signal, and the like. For example, (maximum) effective frequency component ranges of two fourth optical signals are respectively 193.025 THz to 193.075 THz and 193.125 THz to 193175 THz, in other words, center frequencies of the two fourth optical signals are respectively 193.05 THz and 193.15 THz, and a channel spacing is 50 GHz. The combiner unit forms a transmission channel of each fourth optical signal based on the configuration information. When a transmission case changes, the combiner unit may change composition of frequency components of the two fourth optical signals based on the configuration information. For example, the center frequencies of the two fourth optical signals are respectively 193.13125 THz and 193.01875 THz, and effective frequency component widths (channel spacings) of the two fourth optical signals are respectively 75 GHz and 150 GHz, in other words, maximum effective frequency component ranges of the two fourth optical signals are respectively 193-09375 THz to 193.15625 THz and 192.94375 THz to 193-09375 THz. The combiner unit correspondingly forms transmissions channels of the two fourth optical signals based on the configuration information. The combiner unit changes the composition of the frequency component of the at least one fourth optical signal based on the configuration information, so that the optical waveguide apparatus can support transmission of fourth optical signals with different frequency components, and support transmission of fourth optical signals with different effective frequency component widths. Further, use efficiency and performance of the optical waveguide apparatus are improved, and a use range of the optical waveguide apparatus is increased.

Figure 13:
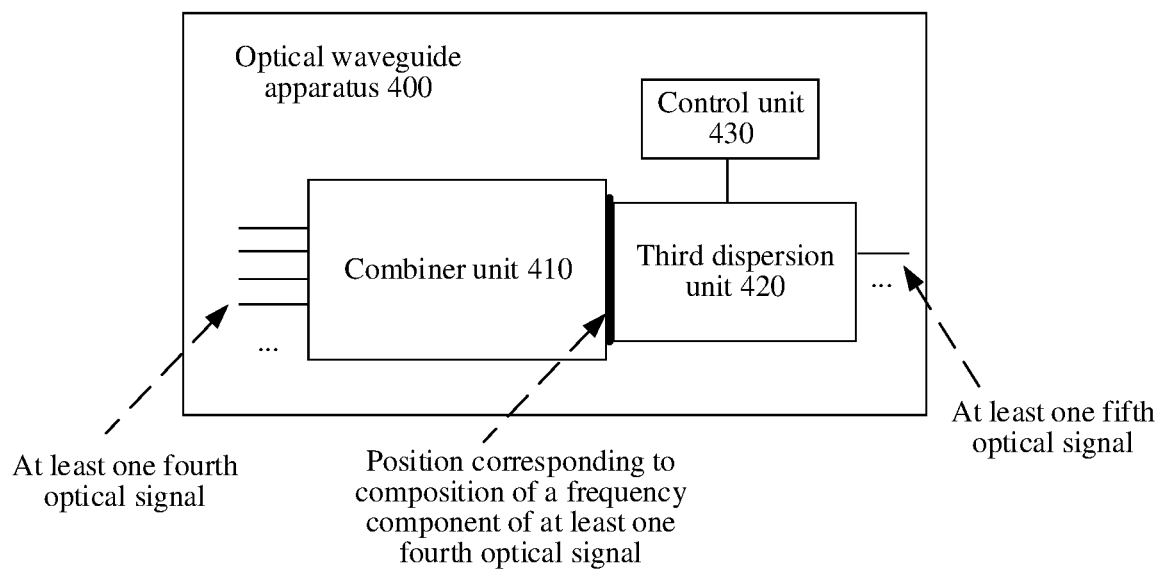
FIG. 13 is a schematic structural block diagram of an optical waveguide apparatus according to another embodiment of this application.

Optionally, in an embodiment, as shown in FIG. 13, the optical waveguide apparatus 400 further includes a control unit 430. The control unit 430 is connected to the combiner unit 410. The control unit 430 is configured to control, based on configuration information, the combiner unit 410 to transmit the at least one fourth optical signal to a position corresponding to composition of a frequency component of the fourth optical signal.

Specifically, the control unit 430 controls, based on the configuration information, the combiner unit 410 to transmit the at least one fourth optical signal to a location corresponding to composition of the frequency component of the at least one fourth optical signal. The control unit 430 may be located inside or outside the combiner unit 410. The control unit 430 may obtain the configuration information, and control, based on information about the composition of the frequency component of the at least one fourth optical signal in the configuration information, the combiner unit 420 to form the transmission channel for transmitting the at least one fourth optical signal, and transmit the at least one fourth optical signal to the position corresponding to the composition of the frequency component of the at least one fourth optical signal.

It should be understood that the optical waveguide apparatus may include one or more control units. This is not limited in this application.

Optionally, in an embodiment, the combiner unit includes a liquid crystal material, and the control unit includes at least one electrode.

Optionally, in an embodiment, a frequency width allowed to be blocked between two adjacent fourth optical signals in the at least one fourth optical signal is greater than or equal to a frequency width corresponding to any one of the at least one electrode.

Optionally, in an embodiment, the optical waveguide apparatus further includes an input unit and an output unit, the input unit is connected to the combiner unit, the input unit is configured to transmit the at least one fourth optical signal to the combiner unit, the output unit is connected to the third dispersion unit, and the output unit is configured to output the at least one fifth optical signal.

Optionally, in an embodiment, the third dispersion unit includes an arrayed waveguide or a concave grating.

It should be understood that the foregoing several embodiments are similar to corresponding embodiments of the optical waveguide apparatus 100. For specific descriptions, refer to similar descriptions of related embodiments of the optical waveguide apparatus 100. For brevity, details are not described herein again.

Optionally, in an embodiment, at least one of the at least one fifth optical signal includes a plurality of optical channels.

Specifically, the combiner unit may transmit the at least one fourth optical signal to the position corresponding to the composition of the frequency component of the at least fourth optical signal. The third dispersion unit combines the at least one fourth optical signal into the at least one fifth optical signal from the position corresponding to the composition of the frequency component of the at least one fourth optical signal. One optical channel corresponds to one single-wavelength optical signal. That is, the fifth optical signal may include a plurality of optical channels. That is, the optical waveguide apparatus in this application can implement an optical signal multiplexing function, and support transmission of optical signals with different channel spacings. Use efficiency and performance of the optical waveguide apparatus are improved.

It should be understood that some fifth optical signals in the at least one first optical signal may include a plurality of optical channels. In other words, some fifth optical signals in a plurality of first optical signals may include a plurality of optical channels, and some fifth optical signals may include only one optical channel. This is not limited in this application.

It should be further understood that each of the at least one fourth optical signal may include a single optical channel. Alternatively, some fourth optical signals in the at least one fourth optical signal may include a plurality of optical channels, and some fourth optical signals may include only a single optical channel. This is not limited in this application.

It should be understood that in the embodiments of this application, first, second, and the like are merely used to indicate that a plurality of objects are different. For example, the first optical signal and the second optical signal are merely used to represent different optical signals, and should not affect the optical signal in any way. First, second, and the like above should not impose any limitation on the embodiments of this application.

It should be understood that, the foregoing descriptions are merely intended to help a person skilled in the art better understand the embodiments of this application, and are not intended to limit the scope of the embodiments of this application. Apparently, a person skilled in the art may make various equivalent modifications or changes based on the foregoing examples. For example, some units or components in the foregoing apparatuses 100 to 400 may be unnecessary, or some units or components may be newly added, or any two or more of the foregoing embodiments may be combined. Such modified, changed, or combined solutions also fall within the scope of the embodiments of this application.

It should be further understood that the foregoing descriptions of the embodiments of this application focus on differences between the embodiments. For same or similar parts that are not mentioned, refer to each other. For brevity, details are not described herein again.

A person of ordinary skill in the art may be aware that, units and algorithm steps of the examples described in combination with in the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the functions in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical waveguide apparatus, comprising:
a first dispersion unit; and
a separation unit;
wherein the first dispersion unit is connected to the separation unit, the first dispersion unit is configured to disperse a frequency component of at least one first optical signal, and wherein the separation unit is configured to separate, into at least one second optical signal, according to configuration information, the frequency component that is of the at least one first optical signal and that is dispersed by the first dispersion unit, wherein the separation unit is implemented by a variable optical waveguide, and wherein the variable optical waveguide is an optical waveguide that implements, according to the configuration information, at least one of forming an optical waveguide, eliminating an optical waveguide, or changing a shape of an optical waveguide; and
wherein the separation unit is further configured to change composition of a frequency component of the at least one second optical signal according to the configuration information.

2. The apparatus according to claim 1, wherein the composition of the frequency component comprises at least one of a channel spacing of an optical signal, a center frequency of an optical signal, or a frequency grid of an optical signal.

3. The apparatus according to claim 1, further comprising a control unit, wherein the control unit is connected to the separation unit, and wherein the control unit is configured to control, according to the configuration information, the separation unit to separate the frequency component of the at least one first optical signal into the at least one second optical signal.

4. The apparatus according to claim 3, wherein the separation unit comprises a liquid crystal material, wherein the control unit comprises at least one electrode, and wherein the control unit determines, using the at least one electrode, and based on the configuration information, whether to apply a voltage to the at least one electrode, wherein applying the voltage to the at least one electrode implements, in the liquid crystal material, at least one of forming an optical waveguide, eliminating an existing optical waveguide, and changing a shape of the existing optical waveguide, and wherein the liquid crystal material is controlled to separate the frequency component of the at least one first optical signal into the at least one second optical signal.

5. The apparatus according to claim 4, wherein a frequency width allowed to be blocked between adjacent second optical signals in the at least one second optical signal is greater than or equal to a frequency width corresponding to any one of the at least one electrode.

6. The apparatus according to claim 1, further comprising:
an input unit; and
an output unit;
wherein the input unit is connected to the first dispersion unit, wherein the input unit is configured to transmit the at least one first optical signal to the first dispersion unit, wherein the output unit is connected to the separation unit, and wherein the output unit is configured to output the at least one second optical signal.

7. The apparatus according to claim 1, wherein the first dispersion unit comprises at least one of an arrayed waveguide or a concave grating.

8. The apparatus according to claim 1, wherein at least one of the at least one first optical signal comprises a plurality of optical channels.

9. The apparatus according to claim 1, further comprising a second dispersion unit, wherein the second dispersion unit is connected to the separation unit, wherein the separation unit is further configured to transmit one or more fourth optical signals in the at least one second optical signal to the second dispersion unit according to the configuration information, and wherein the second dispersion unit is configured to combine the one or more fourth optical signals into at least one third optical signal.

10. The apparatus according to claim 9, further comprising an output unit, wherein the output unit is connected to the second dispersion unit, and wherein the output unit is configured to output the at least one third optical signal.

11. The apparatus according to claim 1, wherein the configuration information comprises a composition of a frequency component of each optical signal of the at least one second optical signal.

12. An optical waveguide apparatus, comprising:
a combiner unit; and
a dispersion unit;
wherein the combiner unit is connected to the dispersion unit, wherein the combiner unit is configured to transmit, according to configuration information, at least one first optical signal to a position corresponding to composition of a frequency component of the at least one first optical signal, wherein the dispersion unit is configured to combine the at least one first optical signal into at least one second optical signal from the position corresponding to the composition of the frequency component of the at least one first optical signal, wherein the combiner unit is implemented by a variable optical waveguide, and wherein the variable optical waveguide is an optical waveguide that implements, according to the configuration information, at least one of forming an optical signal transmission channel, eliminating an optical signal transmission channel, or changing a shape of an optical signal transmission channel; and
wherein the combiner unit is further configured to change the composition of the frequency component of the at least one first optical signal according to the configuration information.

13. The apparatus according to claim 12, wherein the composition of the frequency component comprises at least one of a channel spacing of an optical signal, a center frequency of an optical signal, or a frequency grid of an optical signal.

14. The apparatus according to claim 12, further comprising a control unit, wherein the control unit is connected to the combiner unit, and wherein the control unit is configured to control, according to the configuration information, the combiner unit to transmit the at least one first optical signal to the position corresponding to the composition of the frequency component of the at least one first optical signal.

15. The apparatus according to claim 14, wherein the combiner unit comprises a liquid crystal material, wherein the control unit comprises at least one electrode, wherein the control unit determines, using the at least one electrode according to the configuration information, whether to apply a voltage to the at least one electrode, so that a transmission channel of the at least one first optical signal is formed in the liquid crystal material, and wherein the liquid crystal material is controlled to transmit the at least one first optical signal to the position corresponding to the composition of the frequency component of the at least one first optical signal.

16. The apparatus according to claim 15, wherein a frequency width allowed to be blocked between two adjacent first optical signals in the at least one first optical signal is greater than or equal to a frequency width corresponding to any one of the at least one electrode.

17. The apparatus according to claim 12, further comprising:
an input unit; and
an output unit;
wherein the input unit is connected to the combiner unit, wherein the input unit is configured to transmit the at least one first optical signal to the combiner unit, wherein the output unit is connected to the dispersion unit, and wherein the output unit is configured to output the at least one second optical signal.

18. The apparatus according to claim 12, wherein the dispersion unit comprises an arrayed waveguide or a concave grating.

* * * * *